United States Patent

Sakakibara et al.

[11] Patent Number: 5,857,110
[45] Date of Patent: Jan. 5, 1999

[54] PRIORITY CONTROL WITH CONCURRENT SWITCHING OF PRIORITIES OF VECTOR PROCESSORS, FOR PLURAL PRIORITY CIRCUITS FOR MEMORY MODULES SHARED BY THE VECTOR PROCESSORS

[75] Inventors: Tadayuki Sakakibara, Kunitachi; Teruo Tanaka, Hachioji, both of Japan; Katsuyoshi Kitai, Polo Alto, Calif.; Tadaaki Isobe, Hadano, Japan; Shigeko Hashimoto, Hadano, Japan; Yasuhiro Inagami, Kodaira, Japan; Yoshiko Tamaki, Kodaira, Japan

[73] Assignee: Hitachi, Ltd., Tokyo, Japan

[21] Appl. No.: 760,525

[22] Filed: Dec. 5, 1996

Related U.S. Application Data

[60] Division of Ser. No. 170,743, Dec. 21, 1993, Pat. No. 5,617,575, which is a continuation-in-part of Ser. No. 855,056, Mar. 19, 1992, Pat. No. 5,392,443.

[30] Foreign Application Priority Data

Mar. 19, 1991 [JP] Japan .................................. 03-054435
Dec. 25, 1992 [JP] Japan .................................. 4-345900

[51] Int. Cl.$^6$ .................................................. G06F 13/00
[52] U.S. Cl. ...................... 395/800.02; 395/861; 395/860
[58] Field of Search ..................................... 395/800, 840, 395/848, 800.02, 850–862

[56] References Cited

U.S. PATENT DOCUMENTS

| | | | |
|---|---|---|---|
| 5,060,148 | 10/1991 | Isobe et al. | 395/800 |
| 5,214,769 | 5/1993 | Uchida et al. | 395/425 |
| 5,241,632 | 8/1993 | O'Connell et al. | 395/325 |
| 5,276,902 | 1/1994 | Nakatami et al. | 395/800 |
| 5,367,654 | 11/1994 | Furukawa et al. | 395/425 |
| 5,388,247 | 2/1995 | Goodwin et al. | 395/425 |
| 5,392,443 | 2/1995 | Sakakibara et al. | 395/800 |
| 5,408,627 | 4/1995 | Stirk et al. | 395/425 |
| 5,412,788 | 5/1995 | Collins et al. | 395/425 |
| 5,566,306 | 10/1996 | Ishida | 395/309 |
| 5,617,545 | 4/1997 | Ogata et al. | 395/296 |

*Primary Examiner*—Mehmet B. Geckil
*Attorney, Agent, or Firm*—Antonelli, Terry, Stout & Kraus, LLP

[57] ABSTRACT

In a multiprocessor computer system, individual vector processors are provided with priority switching signal control circuits, respectively, and a storage control unit incorporating a priority control circuit. Priority bit information is provided for priority circuits incorporated in the storage control unit. Paths for priority switching signal issued in accordance with a number of requests as generated and types of instruction generating the requests are provided between the priority switching signal control circuits and the priority control circuit of the storage control unit, while paths for the priority switching signal as generated are provided between the priority control circuit and all the priority circuits.

25 Claims, 21 Drawing Sheets

FIG.3

| BG# | 0 | | | | 1 | | | | 2 | | | | 3 | | | |
|---|---|---|---|---|---|---|---|---|---|---|---|---|---|---|---|---|
| BK# | 0 | 1 | 2 | 3 | 0 | 1 | 2 | 3 | 0 | 1 | 2 | 3 | 0 | 1 | 2 | 3 |
| ADR | 0 | 1 | 2 | 3 | 4 | 5 | 6 | 7 | 8 | 9 | 10 | 11 | 12 | 13 | 14 | 15 |
| | 4 | 8 | 12 | 1 | 5 | 9 | 13 | 2 | 6 | 10 | 14 | 3 | 7 | 11 | 15 |
| | 16 | 20 | 24 | 28 | 17 | 21 | 25 | 29 | 18 | 22 | 26 | 30 | 19 | 23 | 27 | 31 |
| | 32 | 36 | 40 | 44 | 33 | 37 | 41 | 45 | 34 | 38 | 42 | 46 | 35 | 39 | 43 | 47 |
| | ... | | | | | | | | | | | | | | | |

FIG.8

| VPO (INSTRUCTION A) | /a0\a1\a2\a3\ |
| VPO (INSTRUCTION B) | /b0\b1\b2\b3\ |
| PR0-VP0 VP1 VP2 VP3 PR1-VP0 VP1 VP2 VP3 PR2-VP0 VP1 VP2 VP3 PR3-VP0 VP1 VP2 VP3 | (staggered a0/b0, a1/b1, a2/b2, a3/b3 timing diagram) |
| MM0-BK0 BK1 BK2 BK3 MM1-BK4 BK5 BK6 BK7 MM2-BK8 BK9 BK10 BK11 MM3-BK12 BK13 BK14 BK15 | (staggered a0 b0, a1 b1, a2 b2, a3 b3 timing diagram) |
| FETCHED DATA BUFFER (VP0) | /a0\a1\a2\a3\ |
| FETCHED DATA BUFFER (VP1) | /b0\b1\b2\b3\ |
| RECEIVE DATA (VP0) | /a0\a1\a2\a3\ |
| RECEIVE DATA (VP1) | /b0\b1\b2\b3\ |

FIG.18
PRIOR ART

| | |
|---|---|
| VPO (INSTRUCTION A) | /a0\a1\a2\a3\ |
| VPO (INSTRUCTION B) | /b0\b1\b2\b3\ |
| PR0-VP0<br>VP1<br>VP2<br>VP3<br>PR1-VP0<br>VP1<br>VP2<br>VP3<br>PR2-VP0<br>VP1<br>VP2<br>VP3<br>PR3-VP0<br>VP1<br>VP2<br>VP3 | /a0\<br>/ b0 \<br><br>/ a1 \<br>/b1\<br><br>/a2\<br>/ b2 \<br><br>/a3\<br>/ b3 \ |
| MM0-BK0<br>BK1<br>BK2<br>BK3<br>MM1-BK4<br>BK5<br>BK6<br>BK7<br>MM2-BK8<br>BK9<br>BK10<br>BK11<br>MM3-BK12<br>BK13<br>BK14<br>BK15 | / a0 X b0 \<br><br>/ b1 X a1 \<br><br>/ a2 X b2 \<br><br>/ a3 X b3 \ |
| FETCHED DATA BUFFER (VP0)<br>FETCHED DATA BUFFER (VP1)<br>RECEIVE DATA (VP0)<br>RECEIVE DATA (VP1) | /a0\ /a2\a3\ /a1\<br>/b1\ /b0\ /b2\b3\<br>/a0\ /a1\a2\a3\<br>/b0\b1\b2\b3\ |

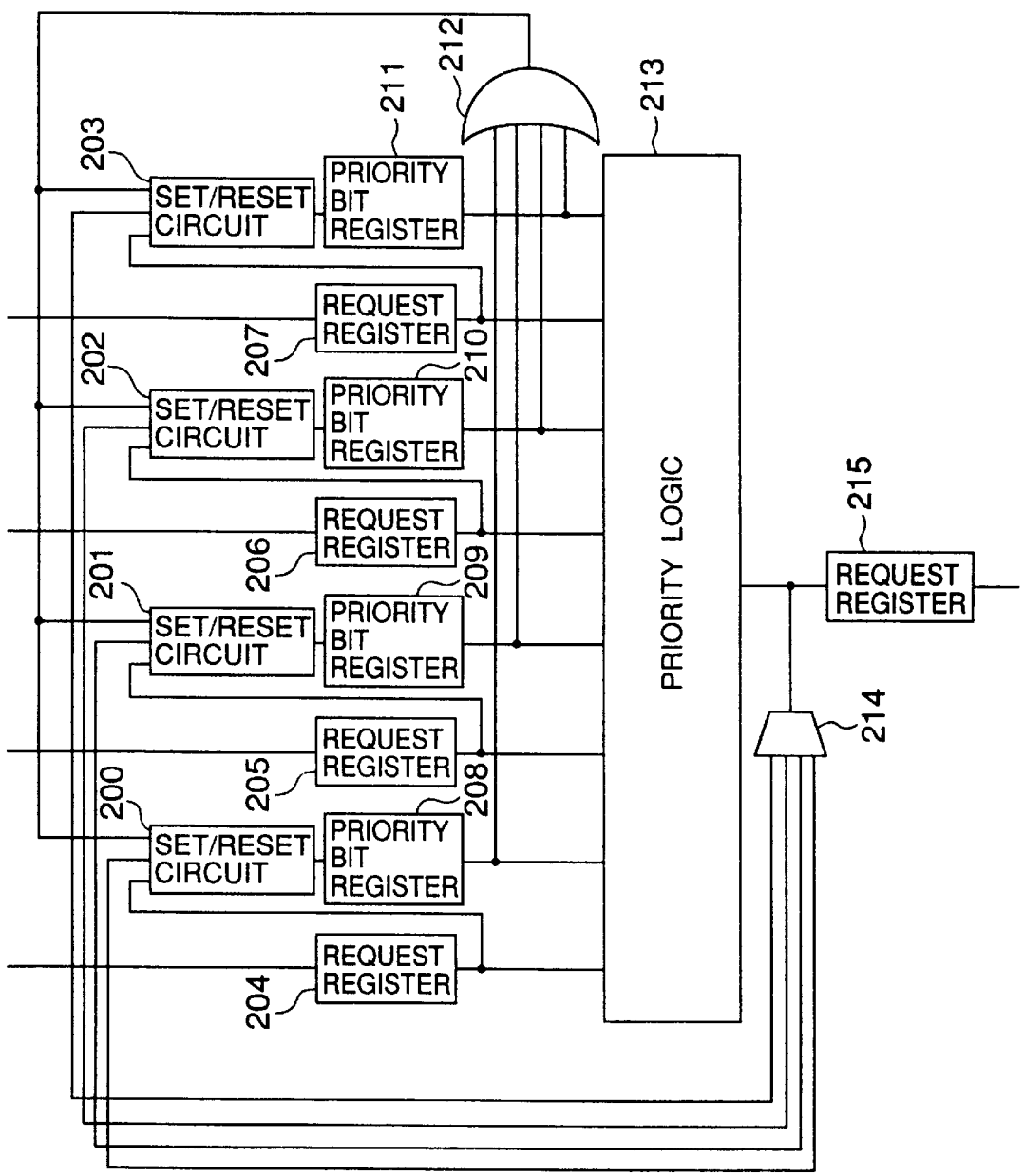

PRIORITY CONTROL WITH CONCURRENT SWITCHING OF PRIORITIES OF VECTOR PROCESSORS, FOR PLURAL PRIORITY CIRCUITS FOR MEMORY MODULES SHARED BY THE VECTOR PROCESSORS

This is a divisional of application Ser. No. 08/170,743, filed Dec. 21, 1993 now U.S. Pat. No. 5,617,575; which is a continuation-in-part of application Ser. No. 07/855,056, filed Mar. 19, 1992, now U.S. Pat. No. 5,392,443.

BACKGROUND OF THE INVENTION

The present invention generally relates to a computer system in which a single memory system or a single storage is shared by a plurality of processing elements such as vector processors. More particularly, the invention is concerned with a computer system in which an access conflict arbitration scheme is adopted for preventing access performance of a main storage from being degraded when an access instruction issued to the main storage includes a plurality of access requests.

There are known several arbitration schemes for priority circuits adapted for selecting one or some from a plurality of access requests. For example, there are known an arbitration schemes in which access requests are selected in accordance with priorities allocated fixedly to the requests, in which requests are selected orderly, starting from the oldest one, in which a request is selected at random from plural ones, and in which a request not selected is newly allocated with a higher priority (disclosed in JP-A-63-66662) and so forth.

A system in which access conflict taking place when a plurality of requesters issue access requests to a plurality of storages is solved by resorting to an arbitration scheme such as mentioned above is disclosed in JP-A-63-66662. This system will first be described by reference to FIG. 17.

In the figure, reference numerals 151, 152, 153 and 154 denote requesters (REQ) which issue access requests to a main storage 168, a numeral 159 denotes a storage control unit (SCU) for sending the requests to the main storage 168 by arbitrating conflict or competition among the requests sent from the requesters (REQ), and a numeral 173 denotes a fetched data buffer for rearraying data read or fetched from the main storage 168 in the order in which the requests were issued by the requesters 151 (REQ0), 152 (REQ1), 153 (REQ2) and 154 (REQ3).

The requesters 151, 152, 153 and 154 are incorporated in associated vector processors (not shown), respectively, and include request senders 155, 156, 157 and 158, respectively, for sending out the requests.

The storage control unit 159 is comprised of request queues 160 (labeled QUE0), 161 (QUE1), 162 (QUE2) and 163 (QUE3) and priority circuits 164 (PR0), 165 (PR1), 166 (PR2) and 167 (PR3) for determining the priority to thereby select the request which is to be first processed upon occurrence of conflict between or among the requests.

The main storage 168 is comprised of four bank groups (memory modules) 169 (labeled BG0), 170 (BG1), 171 (BG2) and 172 (BG3), wherein the bank group or memory module BG0 includes a plurality of memory banks BK0 TO BK3, while the bank group BG1 includes memory banks BK4 to BK7 with the bank group BG2 including memory banks BK8 to BK11 and the bank group BK3 including memory banks BK12 to BK15. The time taken for one requester to make access to the memory bank amounts to several clocks. This time will be referred to as the memory access time. In case any one of the memory banks is being accessed by one of the requests, the other requests are inhibited from accessing that one memory bank.

Concerning the structure of the fetched data buffer 173 in detail, reference may have to be made to JP-A-60-136849, the disclosure of which is herein incorporated by reference.

Next, referring to FIG. 21, a configuration of the priority circuit will be described in detail by taking as example the priority circuit 164.

In FIG. 21, reference numerals 208, 209, 210 and 211 denote registers for holding priority bits of the associated requesters, respectively, numerals 200, 201, 202 and 203 denote set/reset logic, respectively, 213 denotes a priority logic, 212 denotes an OR circuit, 214 denotes a decoder, and a numeral 215 denotes a request register. In the priority circuit 164, the requests issued by the requesters 151 to 154 (FIG. 17) are once latched by request buffer registers 204, 205, 206 and 207, respectively, and selected by the priority logic 213 in accordance with the priority information bits held by the priority bit registers 208, 209, 210 and 211, respectively, wherein the access request as selected is held by the request register 215. At the same time, the request buffer registers 204, 205, 206 and 207 inform the set/reset circuits 200, 201, 202 and 203 of the requests being issued, respectively. The priority logic 213 issues an identification (ID) number of the vector processor to which the requester issued the selected request belongs. This ID information of the vector processor is decoded by the decoder 214 and be sent to one of the set/reset circuits 200, 201, 202 and 203 which corresponds to the vector processor indicated by the decoded ID. On the other hand, the values placed in the priority bit registers 208, 209, 210 and 211 are sent to the set/reset circuits 200, 201, 202 and 203, respectively, after having been logically ORed by the OR circuit 212.

Next, description will turn to a method of setting/resetting the priority bit register 208, 209, 210 or 211 by the corresponding set/reset circuit 200, 201, 202 or 203.

The priority bit register 208, 29, 210 or 211 is set, provided that the request is present in the associated request register 204, 205, 206 or 207, the signal delivered from the decoder 214 is "0" indicating that the above-mentioned request is not selected by the priority logic 213, and that the output value of the OR circuit 212 is "0" indicating that none of the priority bit registers is set.

The priority bit register is reset when the signal outputted from the decoder 214 is "1", i.e., when the request held by the associated requester is selected by the priority logic 213.

Next, description will be directed to the request processing flow.

Referring to FIG. 17, the requesters 151 (REQ0), 152 (REQ1), 153 (REQ2) and 154 (REQ3)are designated to issue the respective requests each having a bank group ID number, a bank ID number and an intrabank address for the destination. The requests as issued are temporarily held by the request queues QUE0, QUE1, QUE2 and QUE3 which correspond to the above-mentioned requesters, respectively, and which are incorporated in the storage control unit 159.

In the state in which the requests are held by the request queues QUE0, QUE1, QUE2 and QUE3, the bank group ID numbers of the requests held in these queues are discriminatively identified to thereby allow the requests to partake in the conflict arbitrations effected by the priority circuits 164 (PR0), 165 (PR1), 166 (PR2) and 167 (PR3) which are provided in correspondence to the bank groups 169, 170, 171 and 172, respectively.

Each of the priority circuits PR0, PR1, PR2 or PR3 selects the request which partakes in the conflict arbitration and which has the priority bit of "1", whereby one of the selected requests is outputted. In case none of the requests having the respective priority bits of "1" exists, one request is selected from all the requests partaking in the conflict arbitration, and subsequently the priority bits of the requests not selected are all set to "1", respectively. Since the priority bits are managed by the respective priority circuits independent of one another, the priority may differ from one to another priority circuit.

By way of example, let's consider the request selected by the priority circuit PR0. This request is sent to one of the memory banks BK0, BK1, BK2 and BK3 belonging to the bank group BG0 in accordance with the destination memory bank ID number added to the selected request. Same holds true for the priority circuits PR1, PR2 and PR3.

In case the instructions being executed by the vector processors are load instructions, data read out from the respective memory banks after lapse of the memory access time (which is assumed to correspond to four clocks in this case) are rearrayed in the fetched data buffer 173 in the order in which the corresponding requests were issued, whereon the data are sent to the respective requesters. On the other hand, when the instructions as executed are store instructions, data (as resulted from the execution are written in the corresponding memory banks, whereupon the access processing comes to an end.

As will be understood from the above, according to the conflict arbitration technique known heretofore, the priority circuits determine the priorities of the requests independent of one another so as to prevent any given one of the requests from being forced to wait for processing for a long time.

The inventors have however found that the system shown in FIG. 17 and described above suffers problems mentioned below when the requesters issue the requests for the instructions which differ from one another.

More specifically, let's assume that instructions A and B are issued simultaneously by the requesters REQ0 and REQ1, respectively, wherein the instructions A and B include request sets $\{a_0, a_1, a_2, a_3\}$ and $\{b_0, b_1, b_2, b_3\}$, respectively, and that the memory banks BK0, BK4, BK8 and BK12 are to be accessed sequentially in this order for executing the instructions A and B.

FIG. 18 illustrates in a time chart the processing of requests mentioned above.

Referring to FIG. 18 along with FIG. 17, the requesters 151 (REQ0) and 152 (REQ1) issue sequentially access requests for the instructions A and B, respectively. The access requests are held by the request queues at a succeeding clock generated by the requesters REQ0 and REQ1 and at the same time undergo the conflict arbitration effected by the priority circuits PR0, PR1, PR2 and PR3.

In this case, the requests $a_0$ and $b_0$ conflict with each other in the priority circuit PR0, the requests $a_1$ and $b_1$ conflict each other in the priority circuit PR1, the requests $a_2$ and $b_2$ conflict in the priority circuit PR2, and the requests $a_3$ and $b_3$ conflict each other in the priority circuit PR3. It is now assumed that in the priority circuits PR0, PR2 and PR3, the priority bit of the requester REQ0 is "1" with the priority bits of the requesters REQ1, REQ2 and REQ3 being "0", respectively, while in the priority circuit PR1, the priority bit of the requester REQ1 is "1" with those of the requesters REQ0, REQ2 and REQ3 being "0". There, the requests $a_0$, $b_1$, $a_2$ and $a_3$ are selected in the priority circuits PR0, PR1, PR2 and PR3, respectively.

The requests $a_0$, $b_1$, $a_2$ and $a_3$ as selected are sent to the memory banks BK0, BK4, BK8 and BK12 of the bank groups BG0, BG1, BG2 and BG3, respectively, at a succeeding clock. From these memory banks accessed by the above-mentioned requests, data are read out after time lapse corresponding to four clocks to be thereby transferred to the fetched data buffer 173.

The memory banks accessed by the requests are inhibited from being accessed for the memory access time corresponding to the four clocks. Consequently, the requests $b_0$, $a_1$, $b_2$ and $b_3$ remaining unselected can partake in the conflict arbitration only after completion of the access request processing for the selected requests $a_0$, $b_1$, $a_2$ and $a_3$.

In the fetched data buffer 173, a set of data as read out from the memory banks are rearrayed in the order in which the corresponding requests were issued and then sent to the requesters issued these requests. Consequently, even a delay in reading the data constituting a member of the data set mentioned above will prohibit the sending of the other data to the concerned requesters. In the case of the example now under consideration, the access request $a_1$ of the instruction A is processed with a delay of four clocks while the requests $b_0$, $b_2$ and $b_3$ of the instruction B are processed with a delay of four clocks, respectively, involving a delay of four clocks in sending the data to the requester REQ0 and REQ1. Thus, executions of the instructions A and B are both delayed by four clocks, respectively.

In this conjunction, it will be noted that when the request $a_1$ of the instruction A is allocated with higher priority than the request $b_1$ for the instruction B, no delay takes place in the processing of the instruction A. In other words, execution of the instruction A can be completed without any delay.

As is apparent from the above discussion, in the circuit configuration in which one set of requests is outputted from each of the requesters to a plurality of priority circuits and in which the priority circuits manage the priorities of the requests independent of one another and change the priorities upon every selection of the requests, occurrence of conflict between or among the requests belonging to the different sets may provide a cause for delay in the processing of the requests of both sets.

In a multiprocessor system operating in a computer center or the like, there may arise a situation in which a particular one of the processors is imparted with a high priority for execution of the processing allocated thereto. In that case, in order to prevent the system performance from degradation due to the conflict with the main storage access instruction (s) for the other processor(s), it becomes necessary to allocate a higher priority to the main storage access request of the particular processor.

SUMMARY OF THE INVENTION

Accordingly, an objective of the present invention is to provide a conflict arbitration scheme for a multiprocessor system which is capable of minimizing a delay involved in the processing performed due to the conflict between memory access requests issued by different processors.

Another objective of the present invention is to provide a conflict arbitration apparatus for a computer system including a plurality of processors, which apparatus is capable of raising priority of a request issued by a particular one of the processors upon accessing a main storage.

In view of the above and other objectives which will become apparent as description proceeds, there is provided according to an aspect of the invention a computer system in which a circuit for generating a priority switching signal is provided in association with each of requesters.

According to another aspect of the invention, there is provided a computer system in which a unit for externally designating a processor whose priority is to be fixed, and a circuit for inhibiting the priority of the designated processor from being updated, are provided in association with a storage control unit.

The invention will become more readily apparent form the following description of preferred embodiments thereof shown, by way of example only, in the drawings.

BRIEF DESCRIPTION OF THE DRAWINGS

FIG. 3 is a view illustrating address allocation to memory banks in the system according to the first embodiment of the invention;

FIG. 8 is a time chart for illustrating operation of the system shown in FIG. 2 in case two of vector processors issue respective vector load instructions;

FIG. 18 illustrates in a time chart the processing of requests executed when one vector load instruction is issued by two vector processors;

FIG. 21 is a block diagram of a hitherto known priority circuit.

DESCRIPTION OF THE PREFERRED EMBODIMENTS

The present invention will be described in detail in conjunction with preferred or exemplary embodiments thereof by reference to the drawings.

Embodiment 1

Figure 1:
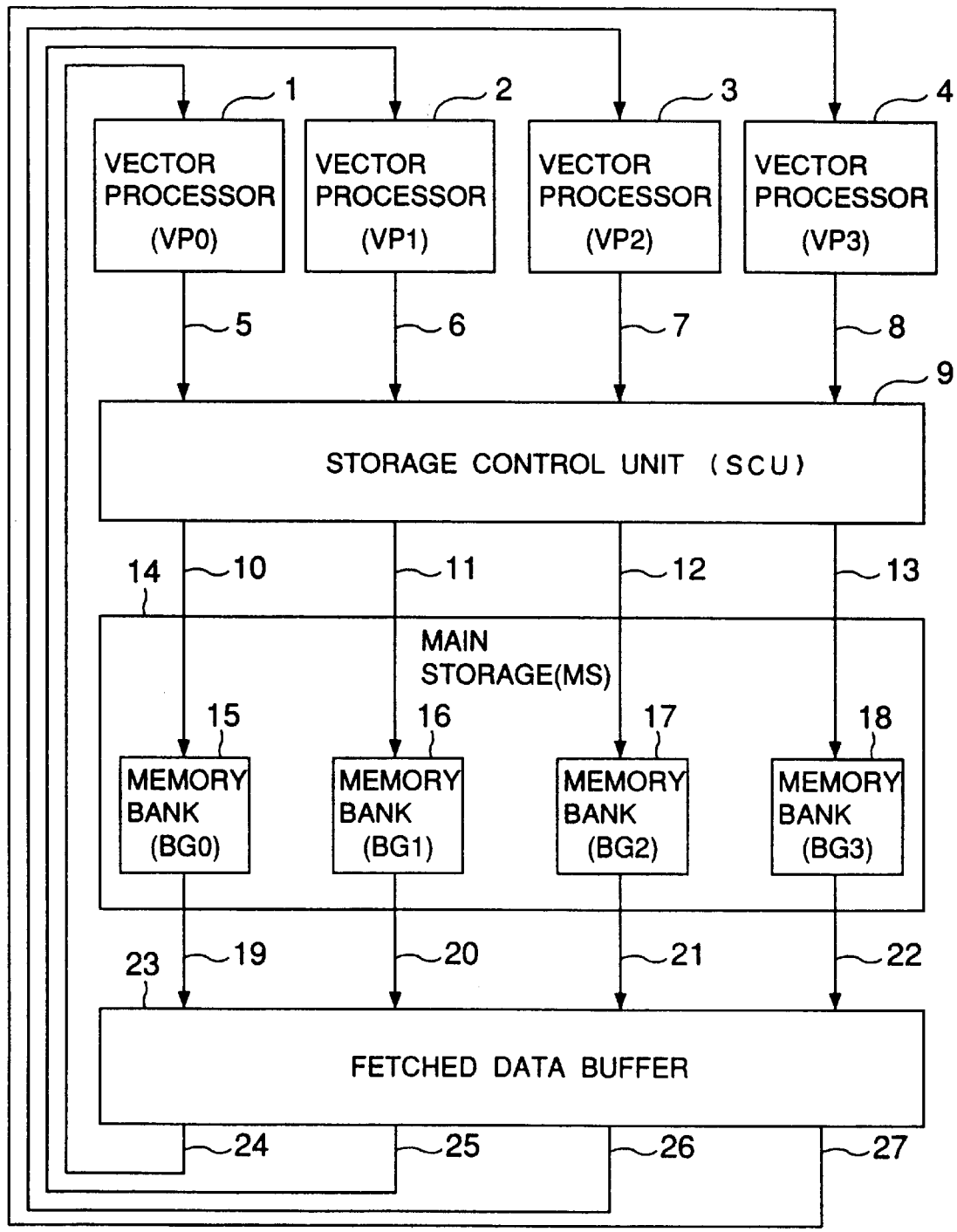
FIG. 1 is a block diagram showing schematically an arrangement of a major portion of a multiprocessor computer system according to first and second embodiments of the present invention.

FIG. 1 is a block diagram showing schematically an arrangement of a major portion of a multiprocessor system according to a first embodiment of the invention. It is assumed that the multiprocessor system includes four vector processors which share a single main storage.

More specifically, the multiprocessor system is comprised of four vector processors 1, 2, 3 and 4 (labeled VP0, VP1, VP2 and VP3, respectively), a storage control unit (SCU) 9, a main storage (MS) 14, and a fetched data buffer 23.

The multiprocessor system according to the instant embodiment of the invention is constructed so that priorities in the priority circuits for the whole system are simultaneously changed over by using a definite unit such as instruction or the like.

In the system shown in FIG. 1, each of the components 1 to 4 and 9 should preferably be realized in the form of an integrated circuit.

The main storage unit 14 is comprised of four bank groups 15, 16, 17 and 18 (labeled BG0, BG1, BG2 and BG3, respectively).

It should here be mentioned that each of the vector processors in the system according to the instant embodiment is capable of issuing a vector load instruction for reading array data (dimensioned data) from the main storage 14 and a vector store instruction for writing arrayed data in the main storage.

The vector load/store instruction issued from any one of the vector processors VP0 to VP3 is decomposed into access requests for individual array elements, respectively, which requests are sent to the storage control unit 9 via respective path 5, 6, 7 or 8. The storage control unit 9 transfers the requests issued from the vector processors VP0 to VP3 to the main storage 14 via paths 10, 11, 12 and 13, respectively. In this case, when two or more of the requests issued from each of the vector processors VP0, VP1, VP2 or VP3 are to be sent to one of the bank groups BG0, BG1, BG2 and BG3, access conflict or competition takes place. The storage control unit 9 serves to arbitrate the access conflict upon sending the requests to the main storage 14.

Upon reception of the request, writing of data into the main memory 14 is completed within a predetermined time when the request originates in a store instruction, while data is read out from the main storage 14 after a predetermined time when the request is of a load instruction. The data as read out are held by the fetched data buffer 23 via a path 19, 20, 21 or 22.

In the fetched data buffer 23, data are rearrayed in the order in which the requests were issued on a processor-byprocessor basis, with the rearrayed data being sent back to the relevant vector processor. Structure and operation of the fetched data buffer 23 are described in detail in JP-A-60-136849, the disclosure of which is incorporated herein by reference and thus further description of the fetched data buffer is omitted.

Figure 2:
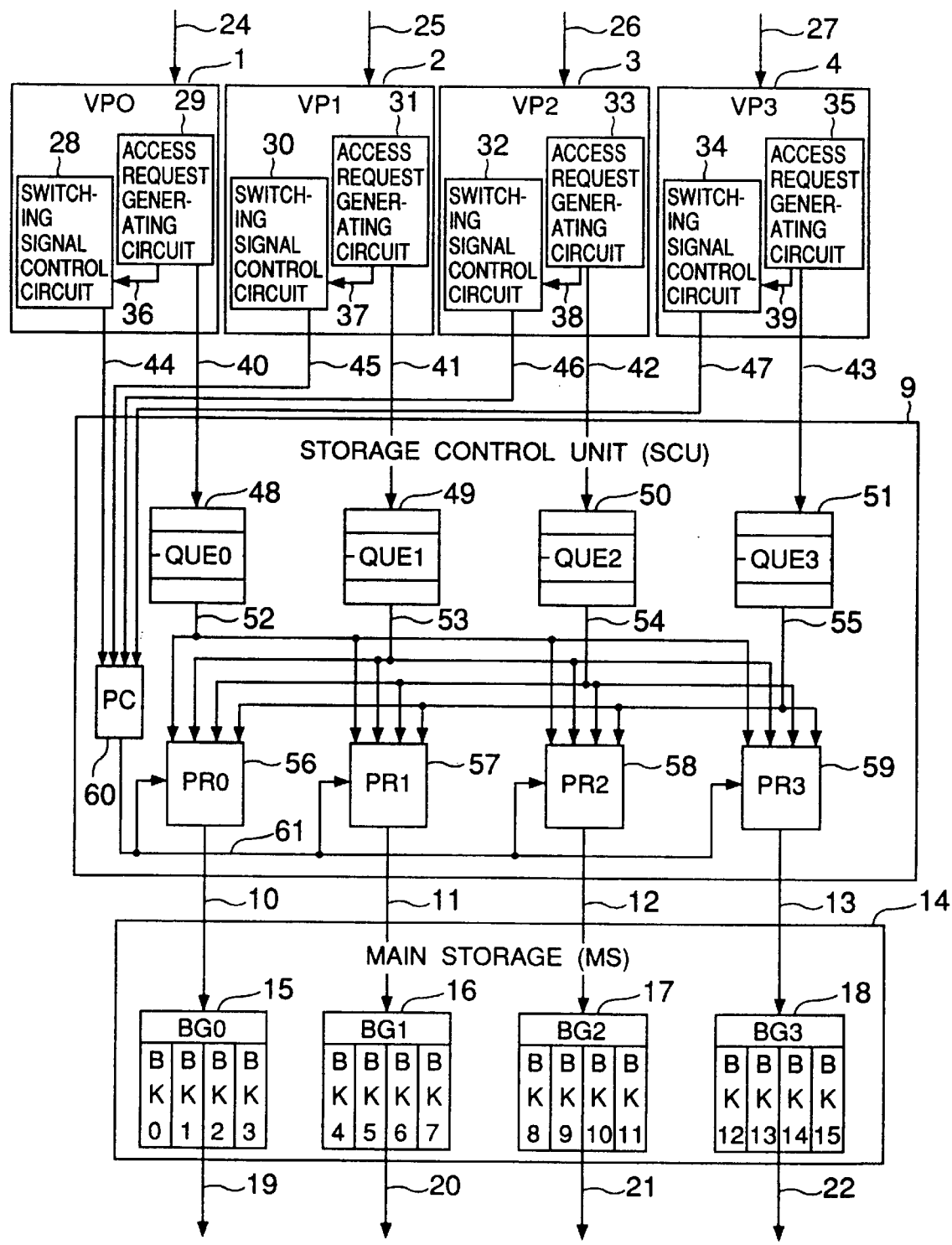
FIG. 2 shows structures of vector processors a storage control unit and a main storage according to the first embodiment of the invention.

FIG. 2 shows in more detail structures of the vector processors (VP0 to VP3) 1 to 4, the storage control unit (STU) 9 and the main storage (MS) 14.

The vector processors VP0 to VP3 are respectively equipped with priority switching signal control circuits 28, 30, 32 and 34, each for generating a priority switching signal to the storage control unit 9, and request generating circuits 29, 31, 33 and 35 for issuing the memory access requests to the storage control unit 9. The request generating circuits 29, 31, 33 and 35 are connected to the priority switching signal control circuits 28, 30, 32 and 34 via paths 36, 37, 38 and 39, respectively. A detailed description of the priority switching signal control circuits will be made later on.

The storage control unit (SCU) 9 includes request queues 48, 49, 50 and 51 (labeled QUE0, QUE1, QUE2 and QUE3) for receiving respectively the access requests issued by the request generating circuits 29, 31, 33 and 35 incorporated in the vector processors VP0 to VP3, priority circuits 56, 57, 58 and 59 (also labeled PR0, PR1, PR2 and PR3) corresponding respectively to bank groups (memory modules) BG0, BG1, BG2 and BG3, respectively, and a priority control circuit (PC) 60 for controlling the priorities of the priority circuits PR0 to PR3 upon reception of the priority switching signals from the vector processors VP0 to VP3. Details of the priority circuit PC will be described later on. The request queues QUE0 to QUE3 are coupled to the priority circuits PR0 to PR3 via paths 52, 53, 54 and 55, while the priority control circuit (PC) 60 is coupled to the priority circuits PR0 to PR3 via a path 61.

The request generating circuits 29, 31, 33 and 35 incorporated in the vector processors VP0 to VP3 are connected to the request queues QUE0 to QUE3 of the storage control unit 9 via paths 40, 41, 42 and 43, respectively.

Figure 17:
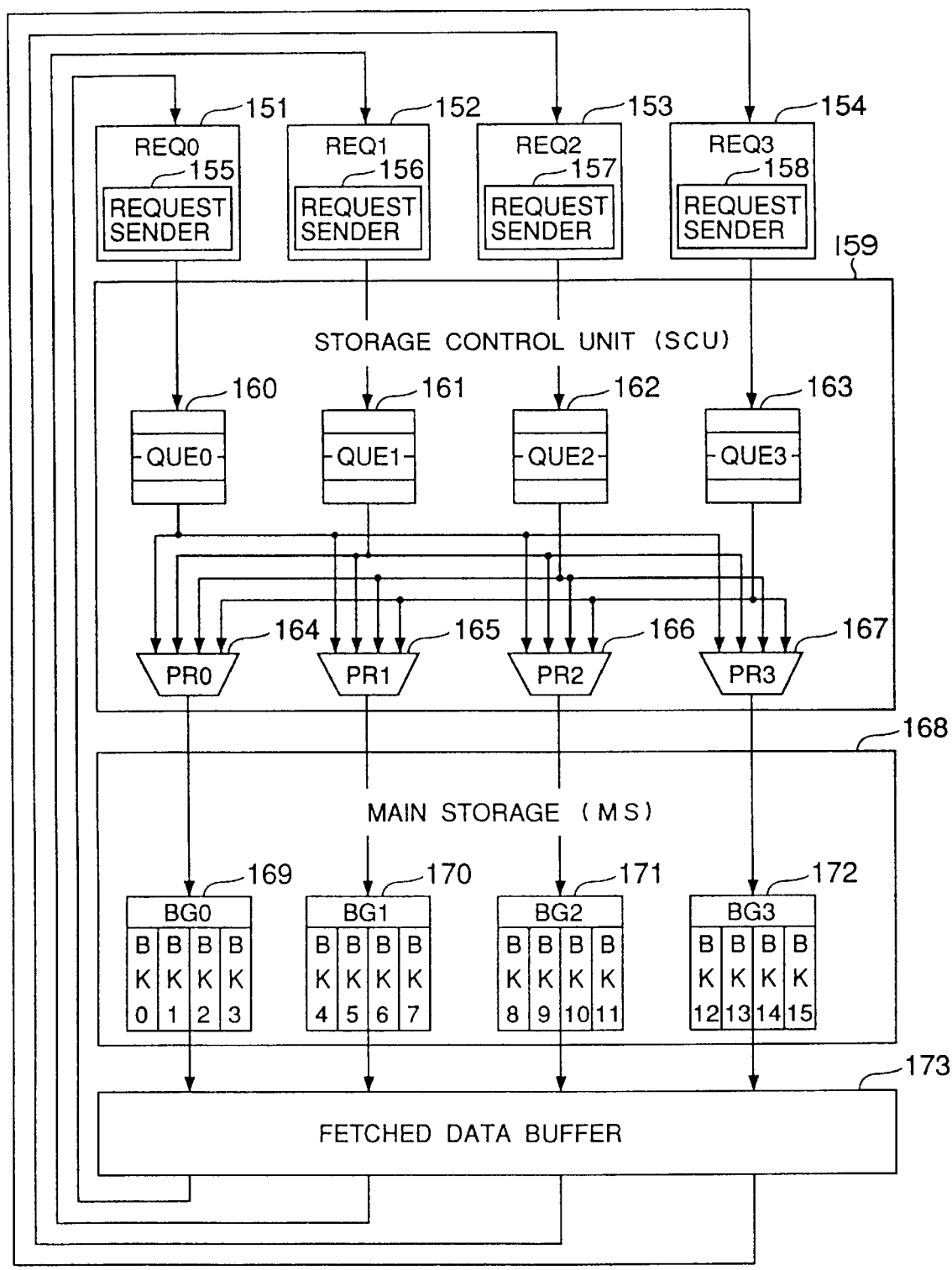
FIG. 17 is a schematic block diagram showing an arrangement of a vector processor known heretofore.

The main storage unit 14 is implemented in the same configuration as the main storage unit 168 described hereinbefore by reference to FIG. 17.

The priority switching signal control circuits 28, 30, 32 and 34 incorporated in the vector processors VP0 to VP3 are coupled to the priority control circuit 60 incorporated in the storage control unit 9 via paths 44, 45, 46 and 47.

The priority circuits (56 to 59) PR0 to PR3 are coupled in one-to-one correspondence to the bank groups (memory modules) 15, 16, 17 and 18 (BG0, BG1, BG2 and BG3) via paths 10, 11, 12 and 13, respectively.

Next, description will turn to address allocation to the memory banks by reference to FIG. 3.

In FIG. 3, reference symbol BG# represents the bank group ID number, BK# represents the memory bank ID number and ADD represents the address. In the case of the address allocation shown in FIG. 3, addresses are sequentially allocated to the different bank groups, and the different memory banks in each of the bank groups are allocated sequentially with respective addresses.

With the address allocation mentioned above, it is assumed that the memory access is made with an equal inter-address distance which is referred to as the stride. With the stride of "2", the accesses are distributed to eight memory banks. With the stride of "4", accesses are distributed to four memory banks. With the stride of "8", the access is distributed only to two memory banks. With the stride of "16", access is concentrated to one memory bank. Thus, in the last mentioned case, the conflict or competition for the memory bank is most likely to occur between or among the access requests. Assuming that the memory access time corresponds to four clocks, the strides of "4", "8" and "16" may bring about unwanted situation in which a particular one of the memory banks is constantly accessed, i.e., the occupied state of the particular memory bank.

Further, when the stride is indefinite as in the case of a list vector instruction, there arises a possibility that the access requests will be concentrated to a particular one of the memory banks, as a result of which the memory bank access conflict is likely to occur, whereby a particular memory bank is undesirably occupied.

Under such circumstances, it is necessary to prevent a particular memory bank from being occupied by changing over the priorities diligently for the instruction having the stride of "4" or a multiple thereof, as well as for the list vector instruction.

Figure 4:
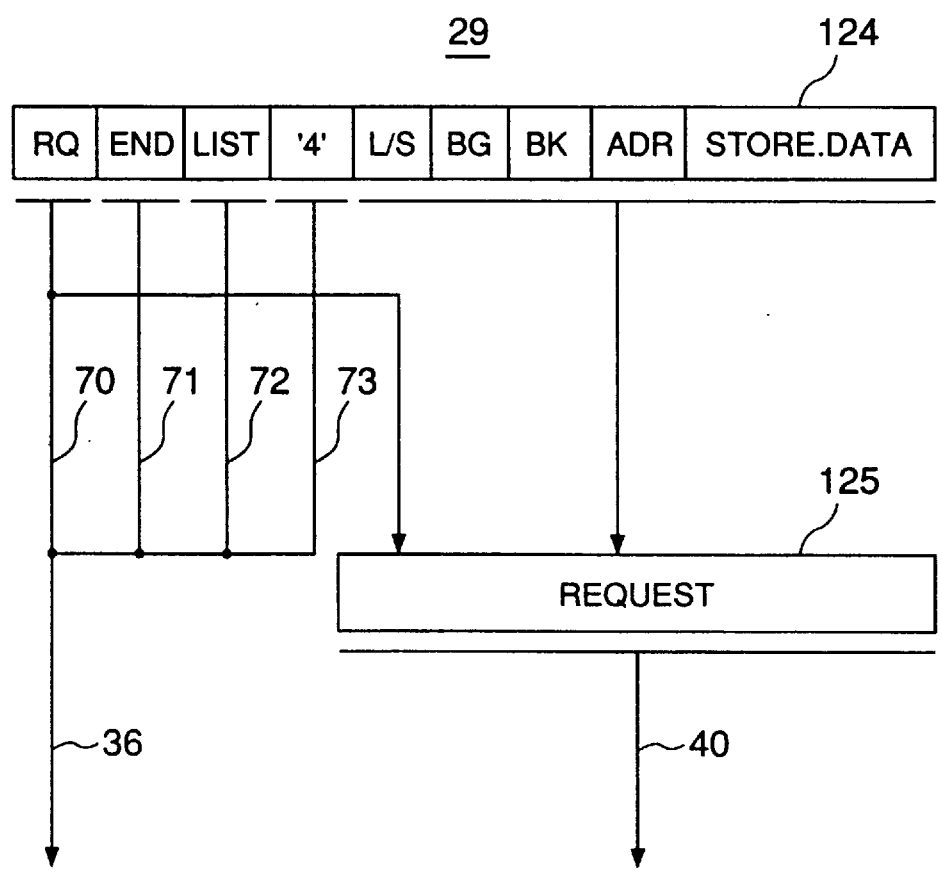
FIG. 4 shows a configuration of the request generating circuit in the system according to the first embodiment of the invention shown in FIG. 2.

FIG. 4 shows in detail a format of the request issued by the request generating circuit 29.

In the figure, reference numeral 124 designates a request generated by the request generating circuit and 125 designates a request delivered to the storage control unit (SCU) 9. In the request 124, "RQ" represents a bit array indicating validity of the request, "END" represents a bit array indicating that the request is a final or end request of the relevant instruction, "LIST" represents a bit array indicating that the relevant instruction is a list vector instruction, "4" is a bit array indicating that the memory access stride is a multiple of "4", "L/S" represents a bit array for indicating whether the relevant instruction is a load instruction or a store instruction, "BG", "BK" and "ADR" represent a destination bank group ID number, a destination memory bank ID number and an address of destination in the memory bank (i.e., intra-memorybank address), respectively, and "STORE DATA" represents data to be stored (hereinafter referred to as "the store data").

Delivered simultaneously to the priority switching signal control circuit 28 are the bits "RQ", "END", "LIST" and "4" through paths 70, 71, 72 and 73, respectively, and via the path 36, as can be seen in FIG. 4.

On the other hand, supplied to the storage control unit 9 are the bits "RQ", "L/S", "BG", "BK", "ADR" and "STORE DATA" through the path 40.

Figure 5:
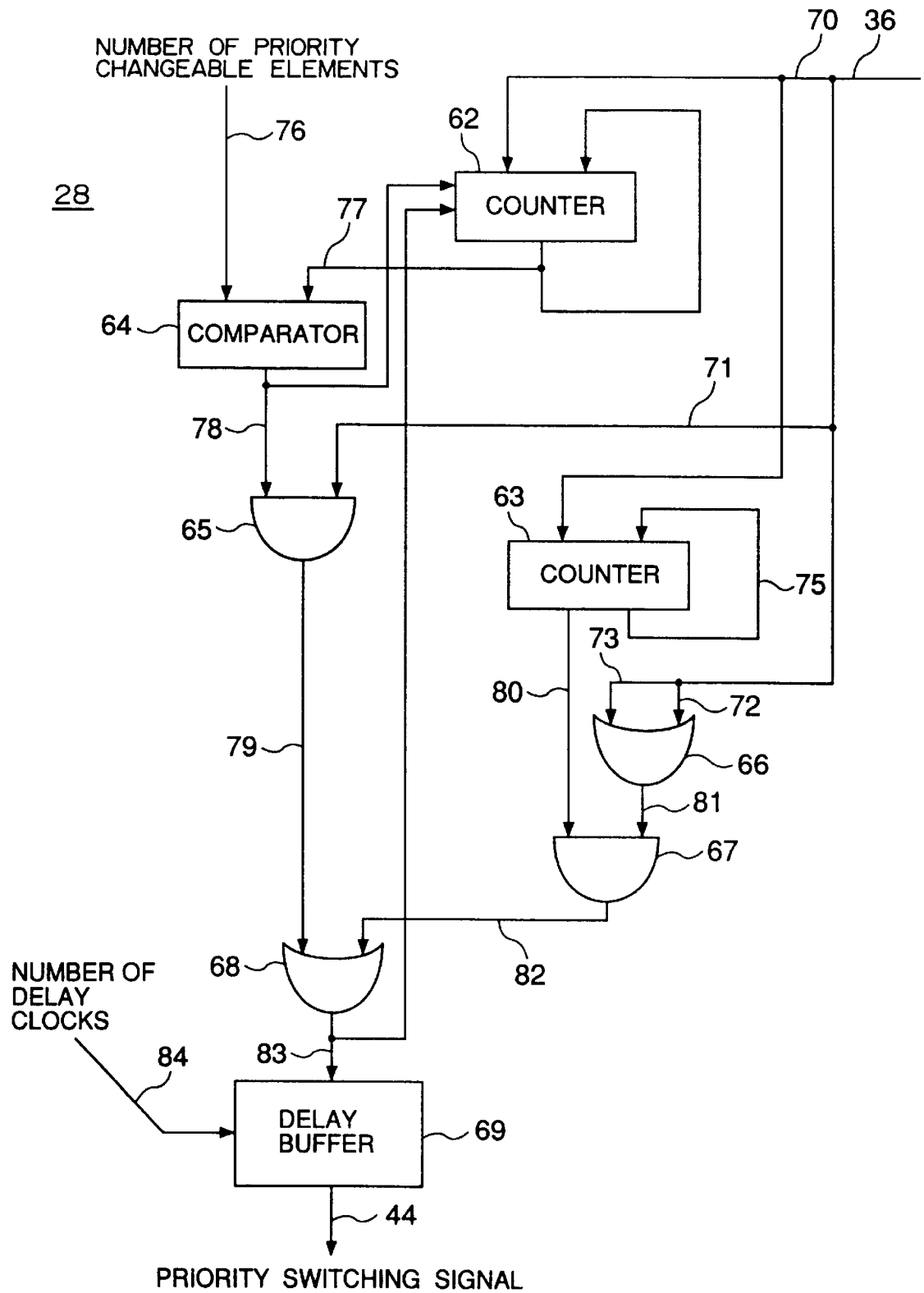
FIG. 5 is a block diagram showing a configuration of a priority switching signal control circuit employed in a vector processor shown in FIG. 2.

FIG. 5 is a block diagram showing in detail a configuration of the priority switching signal control circuit 28.

In FIG. 5, reference numeral 62 denotes a request counter for counting the requests as issued, 63 denotes a counter, 64 denotes a comparator, 65 and 67 denote AND circuits, respectively, 66 and 68 denote OR circuits, respectively, 69 denotes a delay buffer, 70 denotes a path for messaging issuance of a request by a corresponding one of the requesters (e.g. the requester 29 shown in FIG. 2), 71 denotes a path for messaging the end of an instruction, 72 denotes a path for messaging that the instruction of concern is a list vector instruction, 73 denotes a path for messaging that the access strides is a multiple of the number of the bank groups, i.e., a multiple of "4" in this case, 75 denotes a path for coupling the value of the counter 63 to the input thereof, 76 denotes a path for messaging the number of priority changeable elements which corresponds to the number of issued requests which are required at least between two priority switching signals, 77 denotes a path for supplying the value of the counter 62 to the comparator 64, a numeral 78 denotes a path for sending the result of comparison between the paths 76 and 77 to the AND circuit 65, a numeral 79 denotes a path for supplying the result of ANDing operation of the information between the paths 76 and 77 to the OR circuit 68, a numeral 80 denotes a path for supplying a carry signal of the counter 63 to the AND circuit 67, a numeral 81 denotes a path for supplying the result of ORing operation of the information between the paths 73 and 74 to the AND circuit 67, and a numeral 82 denotes a path for sending the result of ANDing of the information between the paths 80 and 81 to the OR circuit 68. The output of the OR circuit 68 is set to the delay buffer 69 as the priority switching signal via a path 83 and at the same time used as a reset input to the counter 62. Further, a path 84 serves for supplying a number of delay clocks which determines a delay time to be effectuated by the delay buffer 69.

The priority switching signal control circuit 28 receives from the request generating circuit 29 via the path 36 a signal indicating issuance of a request, a signal indicating the final or end of an instruction, a signal indicating whether an instruction being executed is a vector instruction or a list vector instruction, and a signal indicating whether or not the access stride of vector data to be processed by the instruction being executed is a multiple of "4". Of the signals mentioned above, the signal indicating issuance of the memory access request is supplied to the counter 62 via the path 70.

The counter 62 in which "0" is placed as the initial value serves to count the request issuance indication signals supplied via the path 70. The comparator 64 receives the value of the counter 62 via the path 77 for comparison with the predetermined number of the priority changeable elements i.e., requesters whose priority is to be changed-over, the information of which is supplied via the path 76. The number of the priority changeable elements should preferably be so selected previously that the system performance is least susceptible to degradation due to the memory access conflict by taking into account the system configuration and characteristics of programs to be executed. When the comparison results in coincidence, a logic "1" signal is supplied to one input of the AND circuit 65 and the disable input of the counter 62. The AND circuit 65 then determines a logical product of the comparison output and the instruction end signal. The output of the AND circuit 65 is then supplied to the OR circuit 68 via the path 79. In this manner, unless the issued element number indicated by the value of the counter 62 is equal to the priority-changeable element number supplied via the path 76, no priority switching signal is issued even upon end of the instruction. In this case, the counter value is not incremented, while the counter 62 is reset when the value on the path 83 is "1". This is for the purpose of preventing the priority from being changed over frequently excessively when vector length is short. The bit number of the counter 62 is determined on the basis of the length of vector register (VR) of the vector processor (i.e., the number of vector elements which can be held by the vector register). By way of example, when the length of the vector register is sixty-four, the bit number of the counter 62 may be five.

However, the maximum number indicated by the counter 62 may be selected greater than the length of the vector register (VR) with the number of the priority changeable elements being also selected greater than the length of the vector register (VR) so that the priority can be changed over once for every instruction train including several instructions.

The element number counter 63 may be constituted by a two-bit counter and is placed with "0" as the initial value.

This counter 63 also serves to count the number of the request issuance indication signals. When the count value of this counter 73 exceeds "3", a carry signal is sent to the AND circuit 67 via the path 80, whereupon the counter 63 is reset to "0". Of course, bit length of this counter 63 is never limited to "2" but may be set to an appropriate value. The counter 63 thus determines the timing at which a signal for lowering the priority of instructions having possibility of occupying a memory bank (i.e., accessing one and the same memory bank in succession) is generated. In the case of the instant embodiment, the signal for lowering the priority is generated every fourth element of instruction.

The OR circuit 66 determines a logical sum of the signal indicating the list vector and the signal indicating the stride of "4" or a multiple thereof as inputted via the paths 73 and 72, respectively.

By logically ANDing the values on the paths 80 and 81, the AND circuit 67 generates the priority switching signal for lowering the priority of the processor which is executing a list vector instruction or instruction requiring data having the stride of "4" or a multiple thereof. The priority switching signal thus generated is supplied to the OR gate 68. In this manner, the priority switching signal is effective for preventing a given one of the instructions from occupying a particular one of the memory banks for a long time.

The OR circuit 68 determines a logical sum products of the signals on the paths 79 and 82 to thereby generate newly a priority switching signal which is then sent to the delay buffer 69 via the path 83. The delay buffer 69 holds therein the priority switching signal for a period corresponding to the number of delay clocks applied via the path 84. Upon lapse of the period mentioned above, the delay buffer 69 transfers the priority switching signal to the priority control circuit 60 incorporated in the storage control unit 9 via the path 44. The path 83 is connected to the reset input of the counter 62 as well. Thus, when the value of the signal on the path 83 is "1", the counter 62 is reset. The delay time introduced by the delay buffer 69 should preferably be so selected as to be a shortest time $t\alpha$ intervening between the issuance of the end request and the time point at which the priority determination is performed in succession to termination or end of the instruction. As a result of this, the priority of a given instruction is changed or altered in synchronism with issuance of the final request and the end of execution of that instruction, as described hereinafter. Besides, when a delay is involved in the processing performance by the priority circuit, the priority is changed-over before the processing for the final or end request. The purpose of generating the priority switching signal before completion of the processing for the final element is to simplify the circuit configuration. It is equally possible to output the priority switching signal after completion of the processing for the final request when occasion requires.

Figure 6:
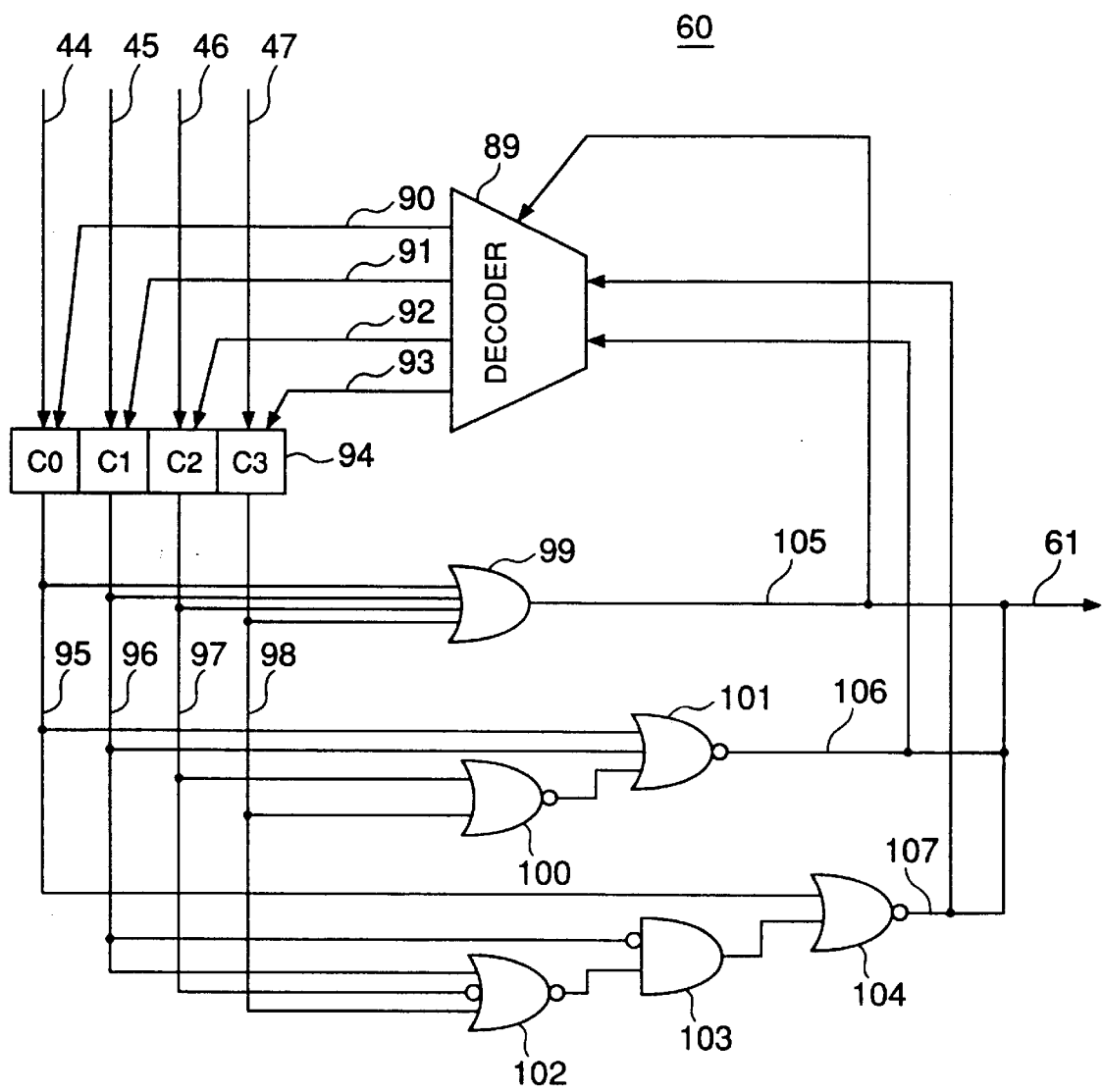
FIG. 6 is a block diagram showing a circuit configuration of a priority control circuit incorporated in the storage control unit shown in FIG. 2.

FIG. 6 is a block diagram showing in detail a circuit configuration of the priority control circuit 60 (FIG. 2).

In FIG. 6, reference numeral 89 denotes a decoder, 94 denotes a register for holding the priority switching signal, 99 denotes an OR circuit, 100, 101, 102 and 104 denote NOR circuits, respectively, 103 denotes an AND circuit, 44, 45, 46 and 47 denotes paths which receives the priority switching signal from the vector processors VP0, VP1, VP2 and VP3, respectively, and 90, 91, 92 and 93 denote paths for inputting a reset signal sent out from the decoder 89 to the reset input of the priority switching signal register 94, respectively. Further, numerals 95, 96, 97 and 98 denote paths for sending the priority switching signal from the priority switching signal register 94 to logic circuits 99, 100, 101, 102, 103 and 104, respectively, 105 denotes a path for sending a priority switching trigger signal generated by logically ORing the priority switching signals of all the vector processors to the priority circuits PR0, PR1, PR2 and PR3, respectively, and reference numerals 106 and 107 denote paths for sending to the priority circuits PR0, PR1, PR2 or PR3 a signal obtained by coding the ID number of the vector processor which is issuing the priority switching signal on the signal line 105. The paths 105, 106 and 107 are combined into a path 61 which thus serves to send the priority switching signal to the priority circuits PR0 to PR3.

The priority switching signal resister 94 includes bits C0, C1, C2 and C3 for holding the priority switching signals issued by the vector processors VP0, VP1, VP2 and VP3, respectively. When any one of the bits C0 to C3 assumes the value of "1", a signal "1" is sent out on the path 105 from the OR circuit 99.

The NOR circuits 100, 101, 102 and 104 and the AND circuit 103 cooperate to coding the ID number of the vector processor which issued the priority switching signal, the coded ID signal being outputted onto the paths 106 and 107. In case all the bits C0 to C3 become simultaneously logic "1", the priority levels or ranks of the vector processors VP0 to VP3 are fixedly determined in the order of C0, C1, C2 and C3, whereupon the ID number of the vector processor having the highest priority is coded. When the bit values C0, C1, C2 and C3 are all selected, there are outputted onto the paths 106 and 107 the bit combinations {0, 0}, {0, 1}, {1, 0} and {1, 1}, respectively.

After sending out the priority switching signal to the priority circuit via the path 61, the decoder 89 resets the priority switching signal register 94 for the vector processor which issued the priority switching signal. More specifically, when the path 105 is at the signal level of "1", the decoder 89 decodes the signal value on the paths 106 and 107 and inputs the decoded value to the reset input of the priority switching signal register 94 to thereby reset the latter. In this manner, of the bits C0 to C3 of the priority switching signal register 94, only the bit(s) sent to the priority circuit PR0 to PR3 is reset.

Figure 7:
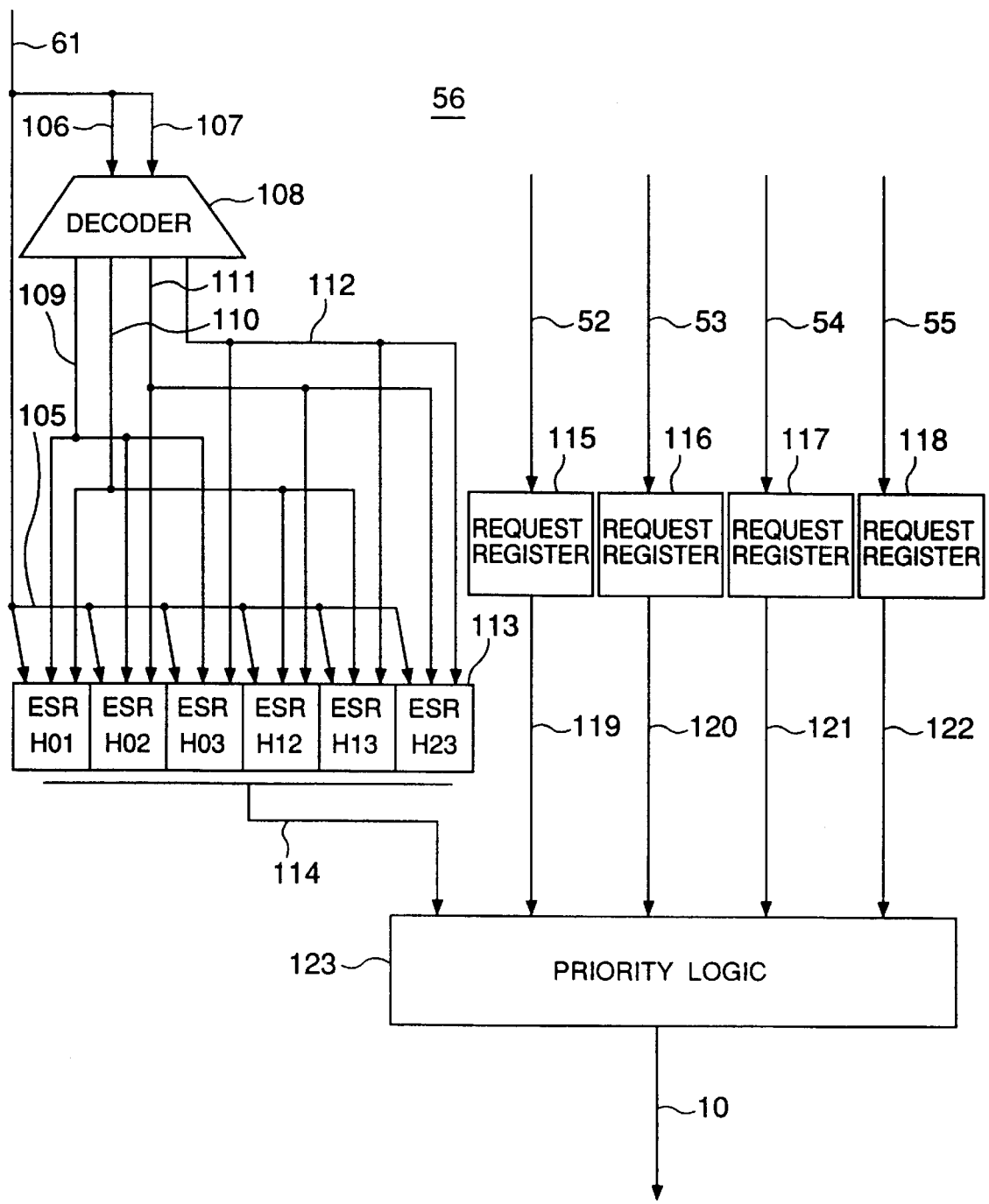
FIG. 7 is a block diagram showing a configuration of a priority switching circuit employed in the storage control unit shown in FIG. 2.

FIG. 7 is a block diagram showing in detail a configuration of the priority circuit 56.

In FIG. 7, reference numeral 108 denotes a decoder, 113 denotes a priority bit register indicating the priorities, 115, 116, 117 and 118 denote request registers for holding the access requests issued by the individual vector processors VP0, VP1, VP2 and VP3, respectively, and a numeral 123 denotes a priority logic. Further, 105, 106 and 107 denote paths for carrying signals derived by decomposing the signal 61 supplied from the priority level control circuit 60. More specifically, the path 105 carries the priority change-over trigger signal, while the paths 106 and 107 carry the coded ID number of the vector processor. Accordingly, the paths 61, 105, 106 and 107 have the same meanings as those designated by the like reference numerals in FIG. 6 The decoder 108 serves to decode the signal value on the path 106 and 107 to thereby set to "1" either the signal line 109, 110, 111 or 112 corresponding to the vector processors VP0 to VP3.

The priority bit register 113 includes a plurality of bits each representing the priority between two of the vector processors. In FIG. 7, the two numerals succeeding to a character "H" representing the priority bit indicate the ID numbers of the two vector processors mentioned above. By way of example, the bits "H01", "H02" and "H03" may represent the priority relations between the processors VP0 and VP1, the processors VP0 and VP2 and between the processors VP0 and VP3, respectively. Further, the bits "H12" and "H13" represent the priority relation between the processors VP1 and VP2 and between the processors VP1 and VP3, respectively. Finally, the bits "H23" represent the priority between the vector processors VP2 and VP3. Further, when the priority bit "H" is "1", this means that the vector processor indicated by the righthand numeral has a higher priority, while the priority bit "H" of "0" indicates that the vector processor identified by the lefthand numeral is allocated with a higher priority. By way of example, when "H" of "H03" is "1", this means that the priority of the vector processor VP3 identified by the righthand numeral "3" is higher than that of the vector processor VP0 identified by the lefthand numeral "0".

In the priority bit register 113, reference character E designates "enable" input, S designates "set" input and R designates "reset" input. Accordingly, only when the priority change-over trigger signal 105 is "1", priority bit set/reset operation is performed. In other words, when the inputs S and R are "1", set and reset operations are correspondingly carried out.

As is apparent from the above description, in each of the priority circuits 56 to 59 in the system according to the instant embodiment of the invention, the register 113 for holding the relative priorities between or among the vector processors is incorporated, wherein the registers 113 of the individual priority circuits 56 to 59 are interconnected by the common priority switching circuit (PC) 60 (see FIG. 2). Consequently, all of these priority registers of the individual priority circuits have a same value. Accordingly, it is conceivable to provide one of these registers 113 in common to all the plural priority circuits. In this case, however, there arises a problem that because hardware size of the bank group increases, it becomes necessary to dispose the bank groups separately from each other, which in turn means that physical distances between the common priority bit register 113 and several bank groups become increase, involving corresponding increase in the delay intervening between the arrival of the access request at the priority circuit and the determination of the access request to be selected on the basis of the value of the priority bit register 113, whereby the performance is degraded. For this reason, the priority register is provided for each of the bank groups for avoiding the delay mentioned above in the case of the instant embodiment.

Again referring to FIG. 2, description will turn to processing flows of the access requests issued by the vector processors.

Assuming now that the vector processor VP0 issues a vector load/store instruction, the request generating circuit 29 responds thereto by issuing a memory access request. This request is comprised of a bit indicating the validity of the request, a destination bank group ID number, a destination memory bank ID number, a destination intra-bank address, a flag identifying discriminatively the vector load instruction or the vector store instruction and store data (i.e., data to be stored) in case the instruction is a vector store instruction.

The access request as issued is sent to the request queue QUE0 via the path 40 to be temporarily held therein. Of course, when the request queue QUE0 has no empty space, the request generating circuit 29 is prevented from generating the access request.

The request held in the request queue QUE0 is supplied to all the priority circuit PR0 to PR3. Each of the priority circuits PR0 to PR3 compares the destination bank group ID number contained in the access request with the ID number of the bank group assigned correspondingly to the priority circuit. When the comparison results in coincidence, the request is accepted to allow it in taking part in the conflict arbitration.

Let's assume that the access requests sent from the queues QUE0 and QUE1 partake in the conflict arbitration performed by the priority circuit PR0. Then, the priority circuit PR0 determines the request to be selected in accordance with the bit value of the priority bit H01 of the priority bit register 113. When the priority bit H01 is "1", the access request from the queue QUE0 is selected, while the request from the queue QUE1 is selected when the priority bit H01 is "1". The selected request is then sent to the bank group BG0.

In the bank group BG0, the access request is transferred to one of the memory banks BK0 to BK3 in accordance with the destination memory bank ID number contained in the request. In the memory bank of concern, the access request processing is completed after lapse of the memory access time mentioned hereinbefore. It is also to be assumed that the memory access time is equivalent to four cycles.

In case the instruction of concern is a vector load instruction, data is read out from the memory bank as accessed to be sent to the fetched data buffer 23 (FIG. 1) via the path 19. In contrast, in the case of the vector store instruction, the processing of the instruction comes to an end at the time point the access processing is completed.

In the fetched data buffer 23, the data as read out on a processor-by-processor basis are rearrayed in the order in which the requests were issued. The rearrayed data are sent to the vector processors VP0 to VP3 in the order in which the access requests were issued by these processors. At the time point when all the data as read out have been sent to all the relevant vector processors, execution of the vector load instruction is completed.

Now, description will be made of a method of changing over or switching the priority in the priority circuit by taking as an example the change of the priority of the vector processor VP0.

Upon issuance of a memory access request from the vector processor VP0, the request generating circuit 29 sends out to the priority switching signal control circuit 28 via the path 36 a signal indicating the validity of the request, a signal indicating that the request of concern is the final or end element or access request of an instruction being executed, a signal indicating the list vector, and a signal indicating the stride of "4" or a multiple thereof.

In the priority switching signal control circuit 28, the combined signal sent along the path 36 is decomposed into the component signals which are to be transmitted along the paths 70, 71, 72 and 73, respectively, as mentioned hereinbefore. First, the value on the path 70 indicating the validity of the request is added to the contents of the counters 62 and 63. The result of addition to the counter 63 is compared by the comparator 64 with the number of the priority switching elements (four in the case of the instant embodiment) determined previously by the path 76, the result of comparison being sent to the AND circuit 65 via the path 78. In the AND circuit 65, the signal on the path 71 indicating the end request of one instruction and the signal on the path 78 are logically ANDed. In this manner, issuance of the priority switching signal is suppressed until the element number indicated by the signal on the path 76 is issued in response to generation of the priority switching signal.

At this juncture, it is assumed that the counter 63 is constituted by a 2-bit counter. Accordingly, when the value of "3" is exceeded, a carry signal is sent out from the counter 63 to the path 80. The OR circuit 66 determines whether the relevant instruction is a list vector instruction or whether the access stride is a multiple of "4". The output of the OR circuit 66 and the signal value on the path 80 are logically ANDed by the AND circuit 67. In this manner, the list vector instruction or the instruction whose access stride is a multiple of "4" which is likely to occupy the memory bank for a long time triggers generation of the priority switching signal at least once for every fourth element which causes the maximum count of the counter 63 to be exceeded.

The OR circuit 68 determines a logical product of the signal values on the paths 79 and 82 to thereby generate the priority switching signal which is sent to the delay buffer 69. In the delay buffer 69, the priority switching signal is held for a period corresponding to a predetermined number of delay clocks given via the bus 84, and thereafter the priority switching signal is sent via the path 44 to the priority control circuit 60 incorporated in the storage control circuit 9. The priority switching should ideally be effected after the final or end request has been selected by the priority circuits 56 to 59. Further, when the access request conflict takes place in the priority circuit 56–59, a time is taken for the final request to be selected by the priority circuit 56–59 from the time point it was generated by the request generating circuit 29. Accordingly, the number of delay clocks should be so selected that the priority can be changed over within a time longer than the least number of clocks intervening between the time point the final request is issued by the request generating circuit 29 and the time point the request is selected by the priority circuit 56–59. In the case of the instant embodiment, the shortest time intervening between the issuance of the final request and the selection thereof corresponds to two clocks, while the number of clocks intervening between the issuance of the final request and the change-over of the priority minus the delay time of the delay buffer 69 is "1". Accordingly, the delay clock number is selected to be "1". Thus, it is possible to switch the priority with the shortest time span between the issuance of the final request by the request generating circuit 29 and the selection thereof by the priority circuit 56–59.

In the priority control circuit 60, the priority switching signal received from the vector processor VP0 via the path 44 is held in the priority switching signal 94 at the bit position C0.

Since the priority switching signal held by the priority switching signal register 94 at the bit position C0 is "1", the OR circuit 99 outputs the priority change-over trigger signal which is sent onto the path 105.

When one of the bits C1 to C3, which hold the priority switching signal issued by the other vector processor(s) is "1", the vector processor ID number "0" held at the bit position C0 is coded by the logic circuits 100, 101, 102, 103 and 104, whereby bit combination {0, 0} is sent out to the paths 106 and 107.

The paths 105, 106 and 107 are combined to the path 61 which leads to each of the priority circuits PR0 to PR3.

When the signal level on the path 105 is "1", the decoder 89 decodes the coded signal {0, 0} on the paths 106 and 107, and the decoded signal is then applied to the reset input of priority switching signal register 94. In this manner, the bit C0 of the priority switching signal register 95 to which the priority switching signal is set via the paths 106 and 107 is reset.

Each of the priority circuits PR0–PR3 receives the coded priority switching signal from the priority control circuit 60 via the path 61.

In the priority circuit 56, the ID number of the vector processor which issued the coded priority switching signal is received by the decoder 108 via the paths 106 and 107. Since both of the signal values received via the paths 106 and 107 are "0" in the case of the example now under consideration, the path 109 carries "1" while signal level of the paths 110, 111 and 112 is "".

Because the priority change-over trigger signal received via the path 105 is "1" and because "1" is applied to the set inputs H01, H02 and H03 of the priority register 113 via the path 109, resulting in that all the bits H01, H02 and H03 are set to "1". Consequently, the priority of the vector processor VP0 becomes lower than that of the vector processors VP1, VP2 and VP3, whereupon the priority change-over processing comes to an end.

Since the priority change-over is effected simultaneously in all the priority circuits, the priority states or levels of all the priority circuits are always equal to one another.

Next, description will be directed to the effect achieved by making the priorities equal to one another in all the priority circuits when the requests of vector load instructions issued by the vector processors VP0 and VP1 conflict with each other in the storage control unit.

It is assumed that the vector processors VP0 and VP1 issue simultaneously instructions A and B which include access request sets $\{a_0, a_1, a_2, a_3\}$ and $\{b_0, b_1, b_2, b_3\}$, respectively and that the memory banks BK0, BK4, BK8 and BK12 are to be sequentially accessed by the requests contained in the instructions A and B. respectively. This situation is illustrated in a time chart of FIG. 8. It is further assumed that the priority in the priority circuits for the vector processor VP0 is higher than that of the vector processor VP1.

On the assumptions mentioned above, it is the requests of the instruction A that the priority circuits select. Consequently, the memory banks BK0, BK4, BK8 and BK12 are first accessed by the requests $a_0$, $a_1$, $a_2$, $a_3$, respectively. On the other hand, with the requests $b_0$, $b_1$, $b_2$, $b_3$, the memory banks BK0, BK4, BK8 and BK12 are accessed after four cycles which represent the memory access time. In the order in which the data as read out from the memory banks are sent to the fetched data buffer 23, the four elements of the instruction A precedes to those of the instruction B, as a result of which the delay in the processing described hereinbefore by reference to FIG. 18 is suppressed.

Next, the effect achieved by changing over simultaneously the priorities of all the priority circuits will be considered by comparing the case where these priorities are fixed.

Figure 19:
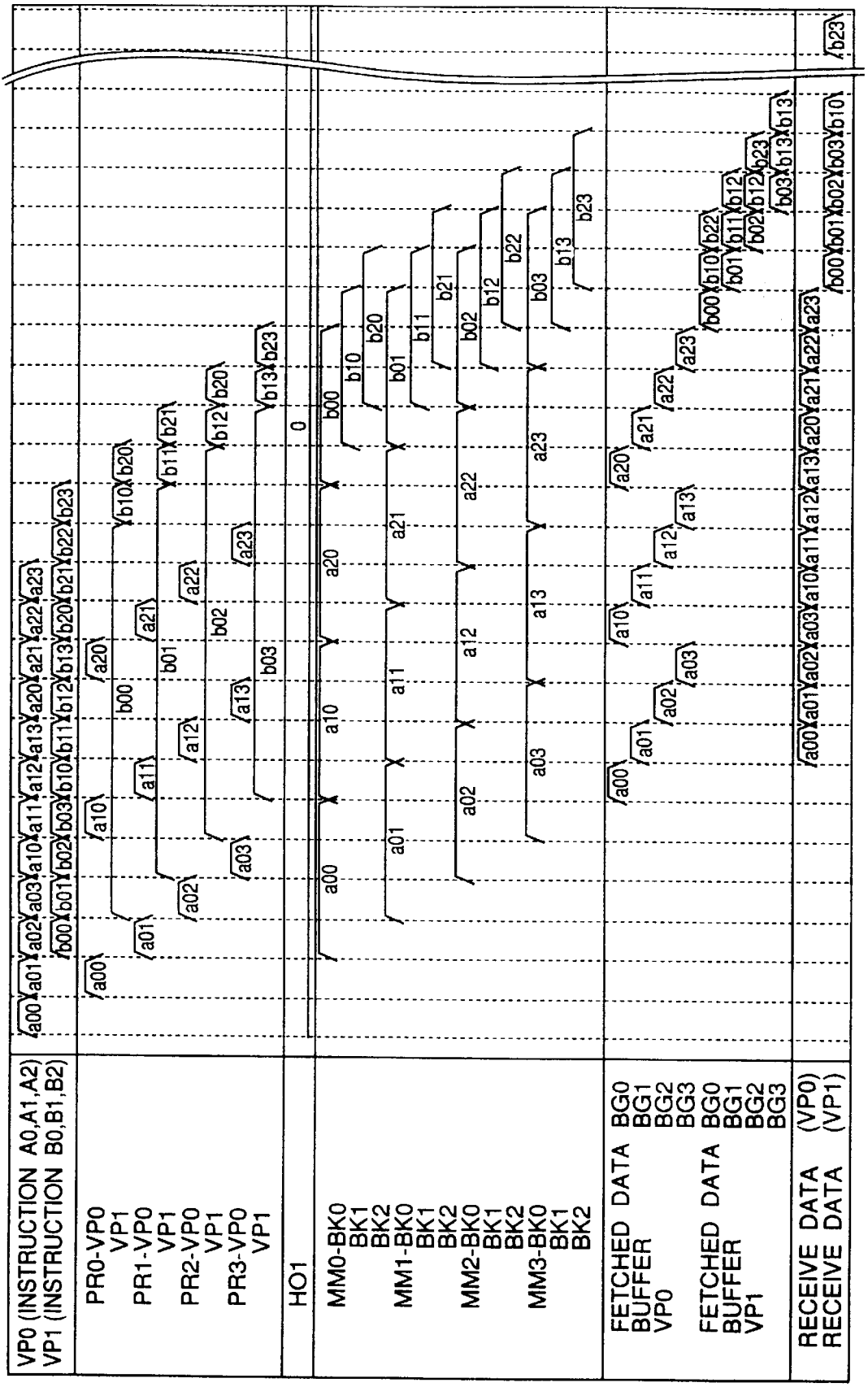
FIG. 19 shows a time chart when two vector processors issues three vector loads instructions on the condition that the priority levels of all the priority circuits are equal to one another and fixed.

FIG. 19 shows a time chart when the vector processor VP0 issues instructions $A_0$ $\{a_{00}, a_{01}, a_{02}, a_{03}\}$, $A_1$ $\{a_{10}, a_{11}, a_{12}, a_{13}\}$ and $A_2$ $\{a_{20}, a_{21}, a_{22}, a_{23}\}$ while the vector processor VP1 issues instructions $B_0$ $\{b_{00}, b_{01}, b_{02}, b_{03}\}$, $B_1$ $\{b_{10}, b_{11}, b_{12}, b_{13}\}$ and $B_2$ $\{b_{20}, b_{21}, b_{22}, b_{23}\}$ on the condition that the priority levels of all the priority circuits are equal to one another and fixed.

It is again assumed that the memory banks BK0, BK4, BK8 and BK12 are to be sequentially accessed with the instructions $A_0$, $A_1$, $A_2$ and $B_0$, the memory banks $BK_1$, $BK_5$, $BK_9$ and $BK_{13}$ are accessed sequentially with the instruction $B_1$, and that the memory banks BK2, BK6, BK10 and BK14 are sequentially accessed with the instruction $B_2$.

Further, it is assumed that the vector processors VP0 has a higher priority than the processor VP1 in each of the priority circuits.

At first, conflict in accessing the memory banks occurs between the instructions $A_0$ and $B_0$. However, since the vector processor VP0 has higher priority, the memory banks BK0, BK4, BK8 and BK12 are accessed first by the request $a_{00}$, $a_{01}$, $a_{02}$, $a_{03}$. After lapse of the four cycles representing the memory access time, conflict takes place between the instruction $A_1$ of the vector processor VP0 and the instruction $B_0$ of the vector processor VP1. In this case, the memory banks BK0, BK4, BK8 and BK12 are first accessed by the requests $a_{10}$, $a_{11}$, $a_{12}$ and $a_{13}$ because the vector processor VP0 has higher priority. After lapse of further four cycles, the access processing for the instruction $A_2$ is first performed. Upon lapse of further four cycles, the memory banks BK0, BK4, BK8 and BK12 are accessed with the instruction $B_0$. The requests $b_{10}$, $b_{11}$, $b_{12}$, $b_{13}$ of the instruction $B_1$ take part in the access competition after the end of conflict arbitration by the priority circuit for the requests $b_{00}$, $b_{01}$, $b_{02}$, $b_{03}$ of the instruction $B_0$, to thereby make access to the memory banks BK1, BK5, BK9 and BK13. Similarly, the requests $b_{20}$, $b_{21}$, $b_{22}$, $b_{23}$ of the instruction $B_2$ partake in the conflict arbitration after the end of the conflict arbitration for the requests $b_{10}$, $b_{11}$, $b_{12}$ and $b_{13}$ of the instruction $B_1$ in the priority circuits, whereby the memory banks BK2, BK6, BK10 and BK14 are accessed.

In order to increase the processing efficiency of the main storage, it is necessary to enhance the availability of the memory banks. However, in case the priorities are fixed as mentioned above, the processing for the requests of the vector processor (VP0) having the higher priority is constantly executed with preference whenever access conflict takes place between the two vector processors. Consequently, the processing for the instructions $B_1$ and $B_2$ succeeding to the instruction which took part in the competition with the instruction A0 executed by the vector processor VP0 and having the lowest priority is delayed even when the requests of the instructions $B_1$ and/or $B_2$ are not involved in the access conflict, as a result of which the availability of the memory banks is lowered, providing a cause for gradation of performance.

Figure 9:
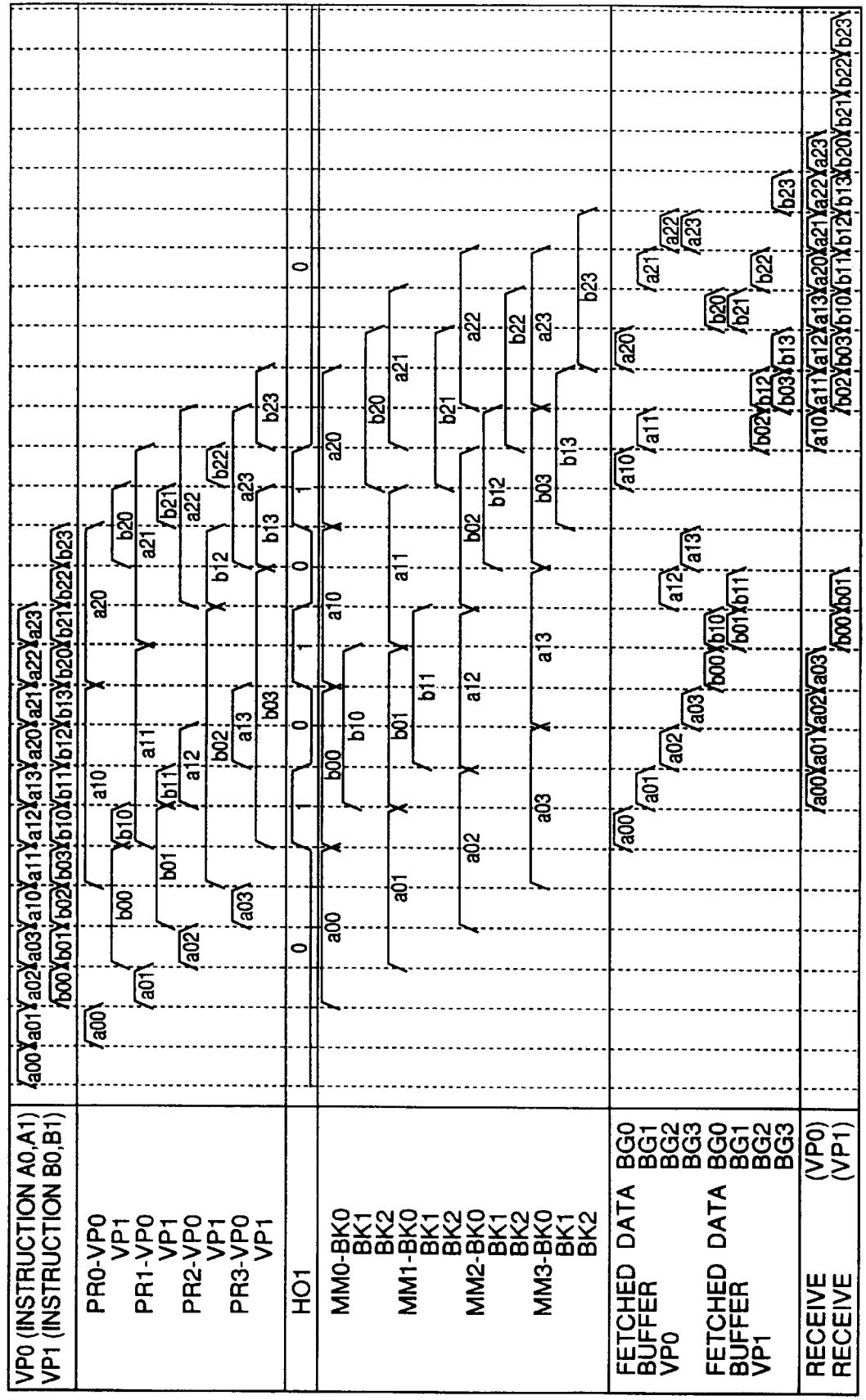
FIG. 9 is a time chart for illustrating operation of the system shown in FIG. 2 in the case where three vector load instructions are issued by two vector processors, respectively.

FIG. 9 shows in time chart corresponding to FIG. 19 in the case where the priorities are changed-over on an construction-by-instruction basis for the same train of instructions as that shown in FIG. 19.

Difference from the situation illustrated in FIG. 19 where the priorities are fixed as described above is seen in the assumption that the priority of the vector processor VP0 becomes lowest after lapse of two clocks from issuance of all the requests of the instruction $A_0$ by the vector processor VP0, whereby the priority of the instruction $B_0$ executed by the vector processor VP1 is raised. Further, the priority of the vector processor VP1 becomes lowest when a time corresponding to two clocks has lapsed from the issuance of all the requests of the instruction $B_0$ executed by the vector processor VP1, whereby the priority of the instruction $A_1$ executed by the vector processor VP0 is raised. Thereafter, the priorities are changed in similar manner. As a result of this, the requests of the instruction $B_0$ processed in succession to the requests of the instruction $A_2$ in the case of the conventional scheme illustrated in FIG. 19 are processed in precedence to the requests of the instruction $A_2$ in the scheme illustrated in FIG. 9. Thus, the access request processing for the instructions $B_1$ and $B_2$ which do not compete with the instructions $A_0$, $A_1$ and $A_2$ of the vector processor VP0 can be performed without need for awaiting completion of the processing for the instructions $A_1$ and $A_2$, whereby the availability of the memory banks is enhanced with the processing performance of the main storage being increased correspondingly.

Embodiment 2

Next, a second embodiment of the invention will be described. The system according to the second embodiment differs from that of the first embodiment in that the priority switching signal is not straight-forwardly outputted from the vector processor but outputted to the storage control unit, being merged to the request. When the priority switching signal as received is "1", the storage control unit issues a dummy request indicating the priority switching signal of "1" to all the priority circuits to allow the priority to be changed in the priority circuits.

Figure 10:
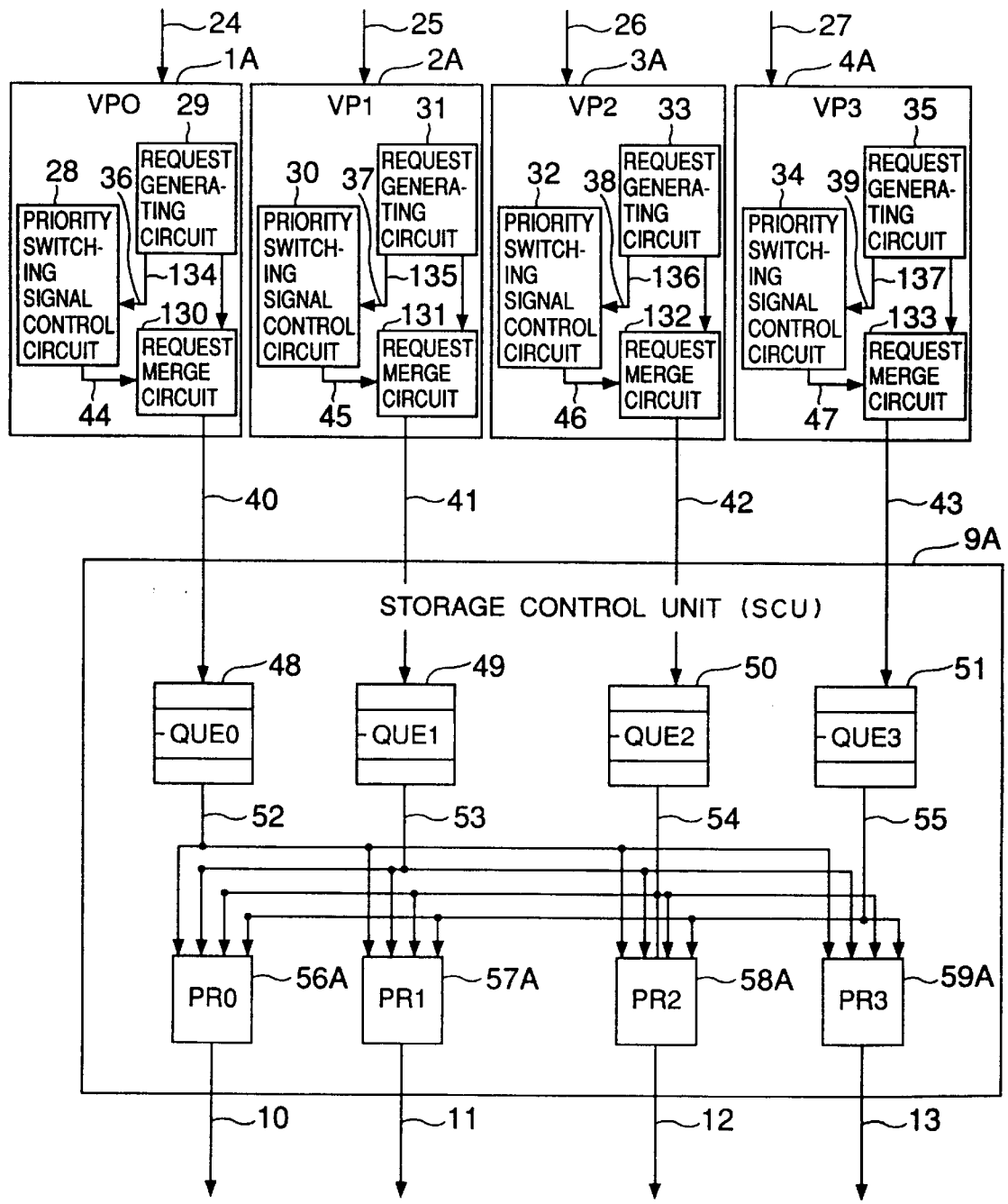
FIG. 10 shows an arrangement of the vector processors and a storage control unit according to a second embodiment of the invention.

FIG. 10 shows arrangements of the vector processors and the storage control unit according to the second embodiment of the invention. The main storage and the fetched data buffer which are the same as those of the first embodiment are omitted from illustration. Further, in FIG. 10, modifications of the circuits or units of the first embodiment are denoted by like reference numerals affixed with "A".

Referring to FIG. 10, the vector processors 1A, 2A, 3A and 4A incorporate request merge circuits 130, 131, 132 and 133, respectively, wherein the paths 44, 45, 46 and 47 extending from the priority switching signal control units 28, 30, 32 and 34 are coupled to the inputs of the request merge circuits 130, 131, 132 and 133 internally of the vector processors 1A, 2A, 3A and 4A, respectively.

The storage control unit 9A differs from that of the first embodiment in that the paths for receiving the priority switching signals from the individual vector processors 1A, 2A, 3A and 4A and the priority control circuit 60 are spared and that the priority circuits 56A, 57A, 58A and 59A are modified. Parenthetically, the units 1A, 2A, 3A, 4A and 9A shown in FIG. 10 should preferably be implemented each in an integrated circuit.

Figure 11:
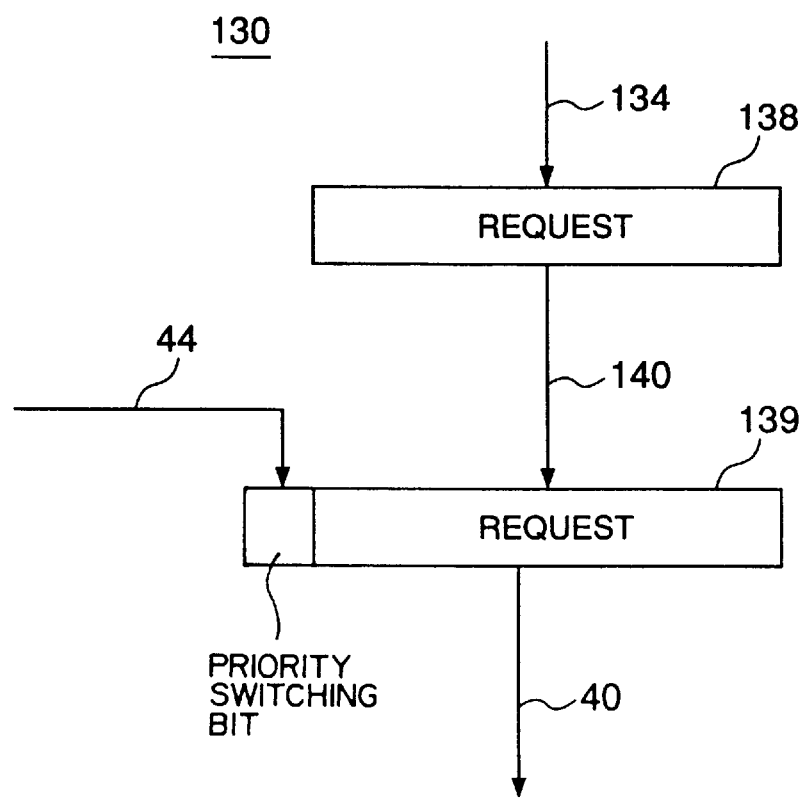
FIG. 11 is a schematic diagram showing a configuration of a request merge circuit employed in the vector processor shown in FIG. 10.

FIG. 11 is a schematic diagram showing a configuration of the request merge circuit 130.

In the figure, reference numeral 138 denotes a request register for holding the request sent from the request generating circuit 29, 139 denotes a request merge register for merging the priority switching signal sent from the priority switching signal control circuit in the request held by a request register 138 as the priority change-over bit, and a numeral 140 denotes a path for coupling together the request holders 138 and 139.

Figure 12:
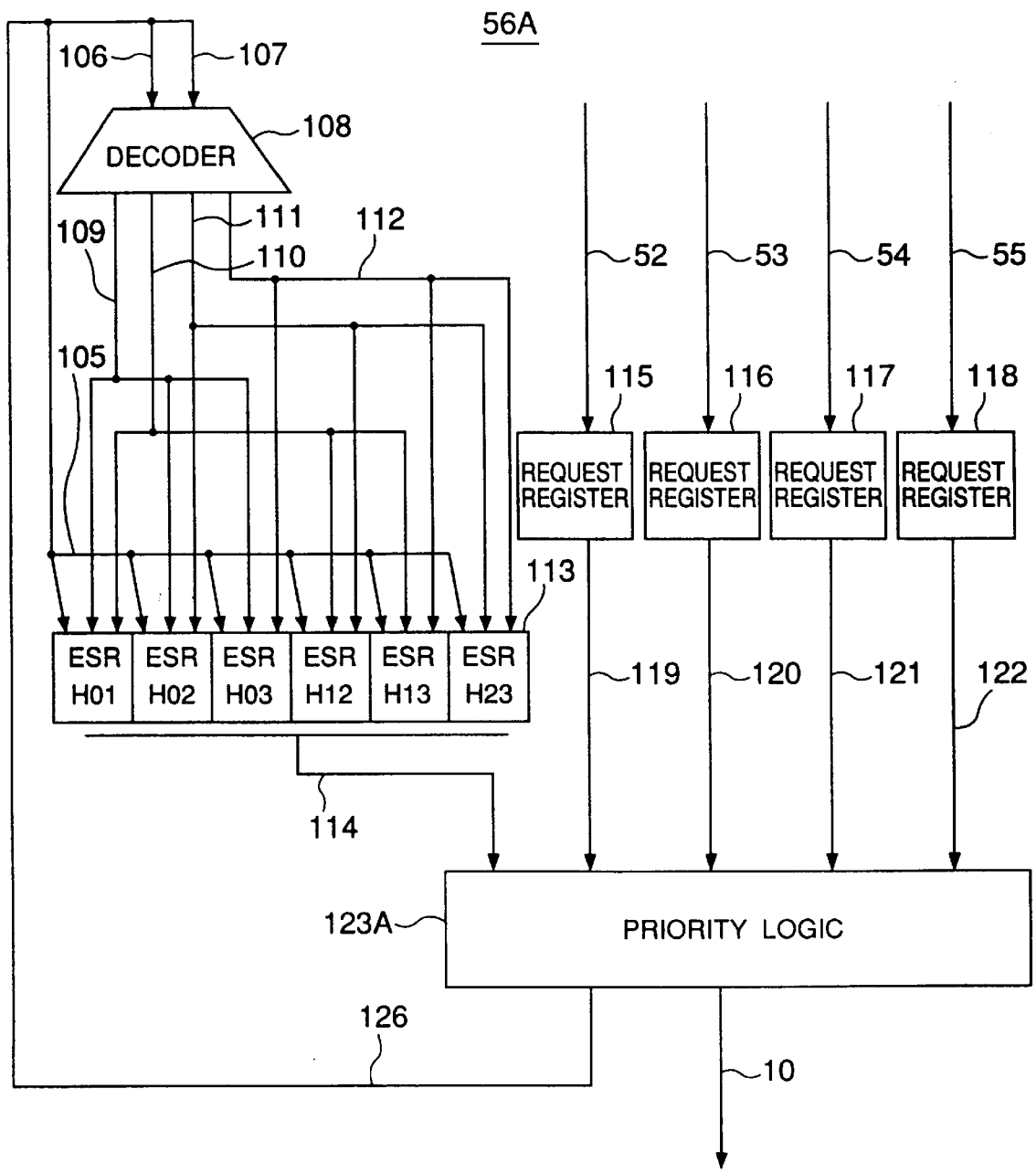
FIG. 12 is a block diagram showing a configuration of a priority circuit employed in the storage control unit shown in FIG. 10.

FIG. 12 is a block diagram showing a configuration of the priority circuit 56A in detail.

Referring to FIG. 12, the priority circuit 56A differs from the priority circuit 56 shown in FIG. 7 in that the signal indicating selection of the request and the ID number of the vector processor issued the selected request are supplied to the decoder 108 and the priority bit register (buffer) 113 from the priority logic 123A via a path 126. With this arrangement, it is possible to lower the priority of the vector processor which issued the request as selected. The method of altering the priority bits is essentially same as that described hereinbefore in conjunction with the first embodiment.

The following description is directed to the request processing flow by referring to FIG. 10 with repetition of the same processing steps as those of the first embodiment being omitted.

In the vector processor VP0, the request issued by the request generating circuit 29 is held by the request merge circuit 130 and merged into the priority switching signal supplied from the priority switching signal control circuit 28.

The request merged in the priority switching signal is once held by the request queue, e.g. the queue QUE0, via the path 40 to be subsequently sent to the priority circuits 56A, 57A, 58A and 59A. In each of the priority circuits, e.g. the priority circuit 56A, when the priority change-over bit is "0", the bank group ID number held by the priority circuit, e.g. 56A, is compared with the destination bank group ID number carried by the request. When the comparison results in coincidence, the request is received. On the other hand, when the priority change-over bit is "1", all the requests are received without performing comparison with the destination bank group ID number provided that the request register, e.g. the register 113 which corresponds to the request queue of concern, e.g. QUE0 is empty, whereon the request accept signal (not shown) is issued to the requester. Upon reception of the request accept signals from the request registers 113 of all the priority circuits, the requester takes that the request has been accepted, whereupon the requester performs subsequent processing.

In response to reception of the request, the priority circuit 56A processes the request in the same manner as described previously in conjunction with the first embodiment when the priority change-over bit of the request selected as the result of the conflict arbitration is "0". On the other hand, when the priority change-over bit of the request as selected is "1", the request priority switching signal of "1" and the vector processor ID number issued the request of concern are sent onto the path 126 with the request itself being sent onto the path 10. Further, when the priority change-over bit is "1", comparison with the bank group ID number is performed. When the comparison results in coincidence, the request is sent out onto the path 10 while the sending of the request to the path 10 is inhibited, when the above-mentioned comparison results in discrepancy.

Next, description will turn to differences of the priority change-over processing according to the instant embodiment of the first embodiment.

The result having the priority switching bit of "1" merged therein in the request merge circuit 130 is received by all the priority circuits.

When the priority change-over bit of the request selected in the priority circuit, e.g. the circuit PR0 is "1", the priority switching signal of "1" and the ID number of the vector processor which issued the selected request are supplied to the decoder 108 and the priority register 113 via the path 126.

Subsequently, the priority change-over is effected in the similar manner as described previously in conjunction with the first embodiment.

Figure 13:
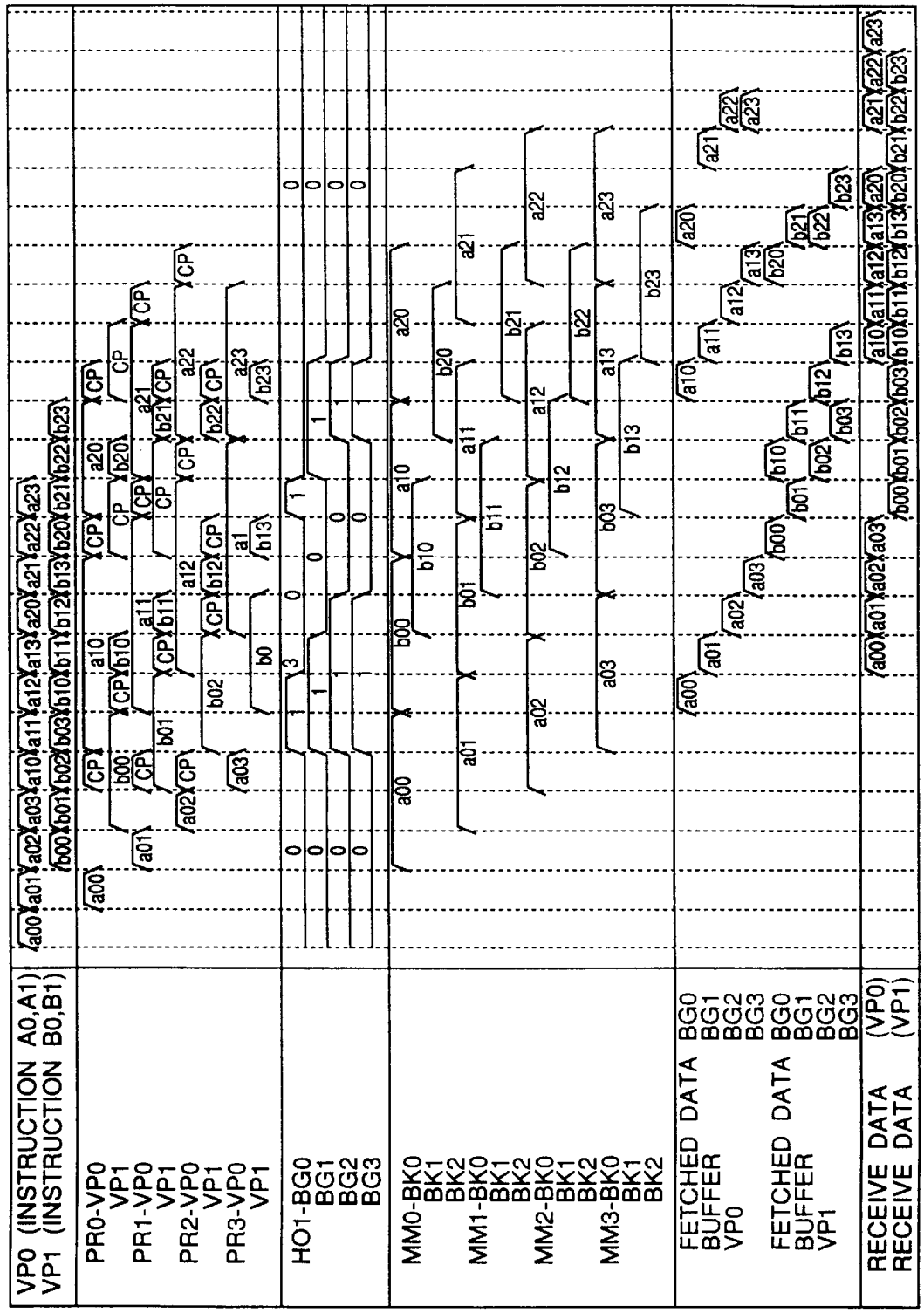
FIG. 13 shows a time chart in the case where three vector load instructions are issued by each of two vector processors in the system shown in FIG. 10.

FIG. 13 shows a time chart in the case where instruction train shown in FIGS. 19 and 9 is used. As can be seen from the figure, since the priority is changed over after having received the final or end request in each bank groups, the priority can be changed over in correspondence to the change-over of the instruction, whereby more accurate control can be realized, when compared with the first embodiment.

Embodiment 3

Next, a third embodiment of the invention will be described. According to the teaching of the invention incarnated in the third embodiment, it is assumed that two main storages and two storage control units are provided. On this assumption, there is provided a device for changing over simultaneously the priorities of the priority circuits in the whole system.

Figure 14:
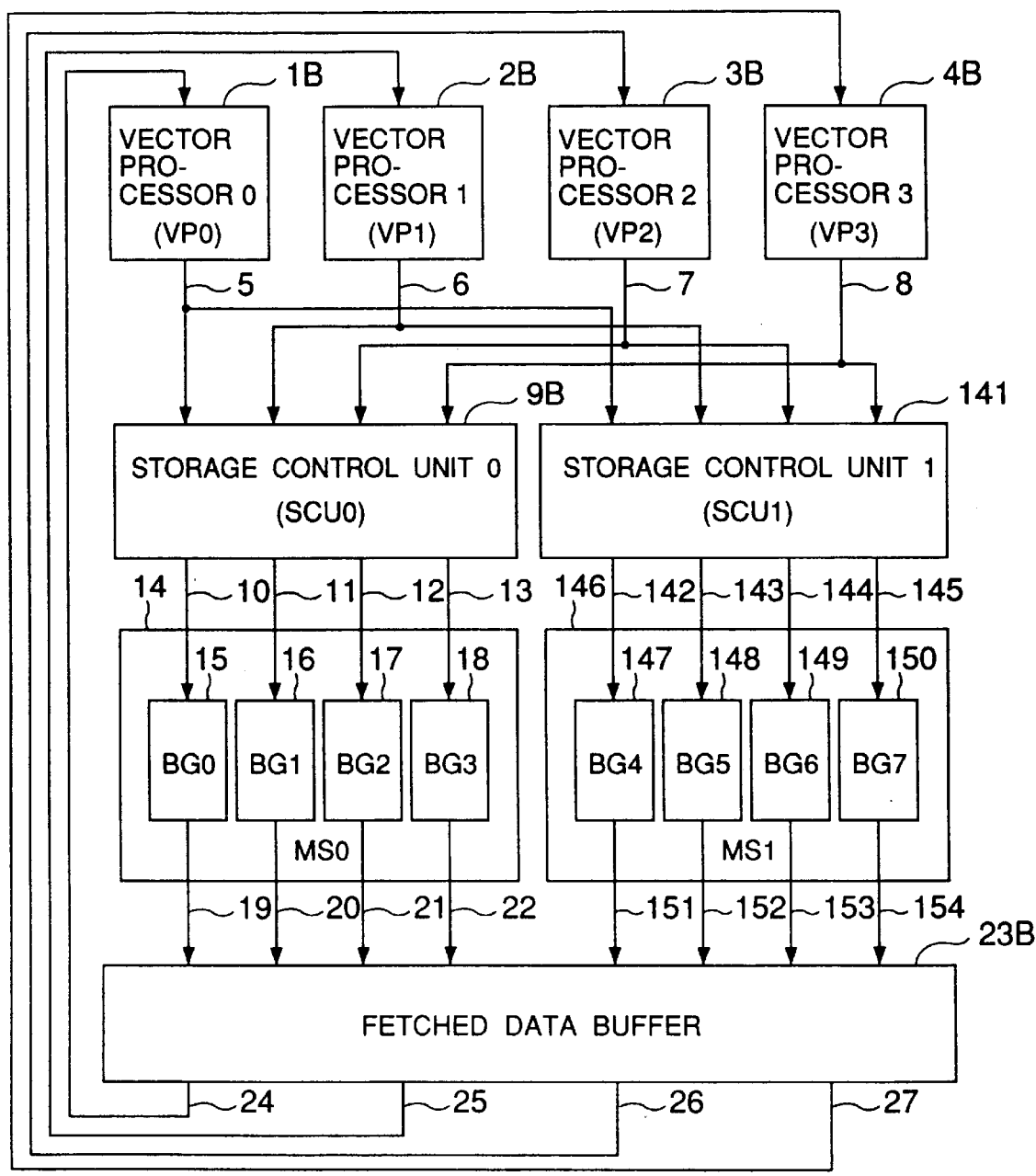
FIG. 14 shows major portions of computer systems according to third and fourth embodiments of the invention, respectively.
Figure 15:
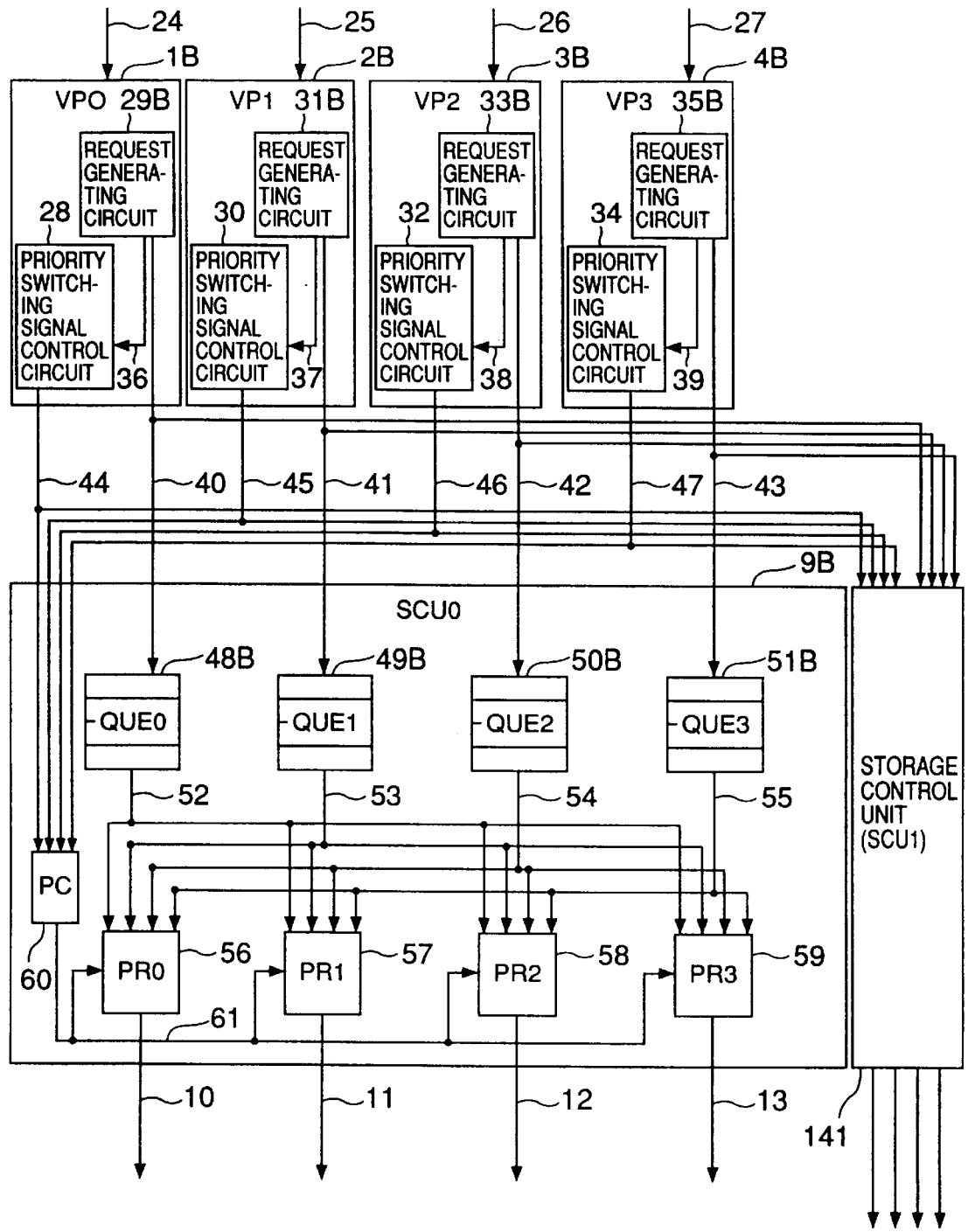
FIG. 15 shows configurations of vector processors and a storage control unit in a system according to a third embodiment of the invention.

FIG. 14 shows a computer system according to the third embodiment, and FIG. 15 shows in detail configurations of the vector processors and the storage control unit. In FIGS. 14 and 15, parts same as or equivalent to those of the first embodiment are denoted by like reference characters. Further, modifications of the circuits or units employed in the first embodiment are denoted by like reference numerals each affixed with "B".

In FIG. 14, a storage control unit 141 (SCU1) is implemented in the same configuration as the storage control unit 9B (SCU0). Similarly, a main storage unit 146 (MS1) is implemented in the same configuration as that of the main storage unit 14 (MS0). A fetched data buffer 23B is adapted for rearraying data read or fetched from both the main storages MS1 and MS0. In this respect, the fetched data buffer 23B differs from the corresponding ones employed in the second and third embodiments.

Referring to FIG. 15, the vector processors 1B, 2B, 3B and 4B differ from those of the first embodiment in that the requests issued by the request generating circuits 29B, 31B, 33B and 35B are each affixed with the ID number of the destination main storage.

Further, difference from the first embodiment is seen in that in the storage control unit 9B, each of the request queues 48B, 49B, 50B and 51B discriminatively identifies the destination main storage ID number affixed to the request, wherein the destination main storage ID number which is the same as that held by the main storage control unit 9B is then held in the request queues.

The request flow processing according to the instant embodiment differs from that of the first embodiment in the respects described below. The vector processors 1B, 2B, 3B and 4B issue requests simultaneously 9B and 141 via the paths 40, 41, 42 and 43. In the storage control units 9B and 141, the destination main storage ID numbers affixed to the requests are discriminatively identified by the request queues 48B, 49B, 50B, 51B and others to thereby determine whether the requests should be held or not. In this request, the instant embodiment differs from the first embodiment. In the storage control unit 9B, the requests to the main storage MS0 are selected and held, while in the storage control unit 141, the requests to the main storage MS1 are selected to be held thereby.

Further, the priority change-over processing flow differs from that of the first embodiment in the respects mentioned below. The priority switching signals issued by the priority switching signal control units incorporated in the vector processors 1B, 2B, 3B and 4B are supplied simultaneously to the storage control units 9B and 141 via the paths 44, 45, 46 and 47. By virtue of this feature, it is possible to switch simultaneously the priorities of the priority circuits for the whole system.

The instant embodiment can thus ensure performance comparable to that of the first embodiment.

Embodiment 4

Description will now be made of the fourth embodiment of the invention, which differs from the third embodiment in that the priority switching signal is merged into the request to be subsequently outputted to the storage control unit as in the case of the second embodiment.

Figure 16:
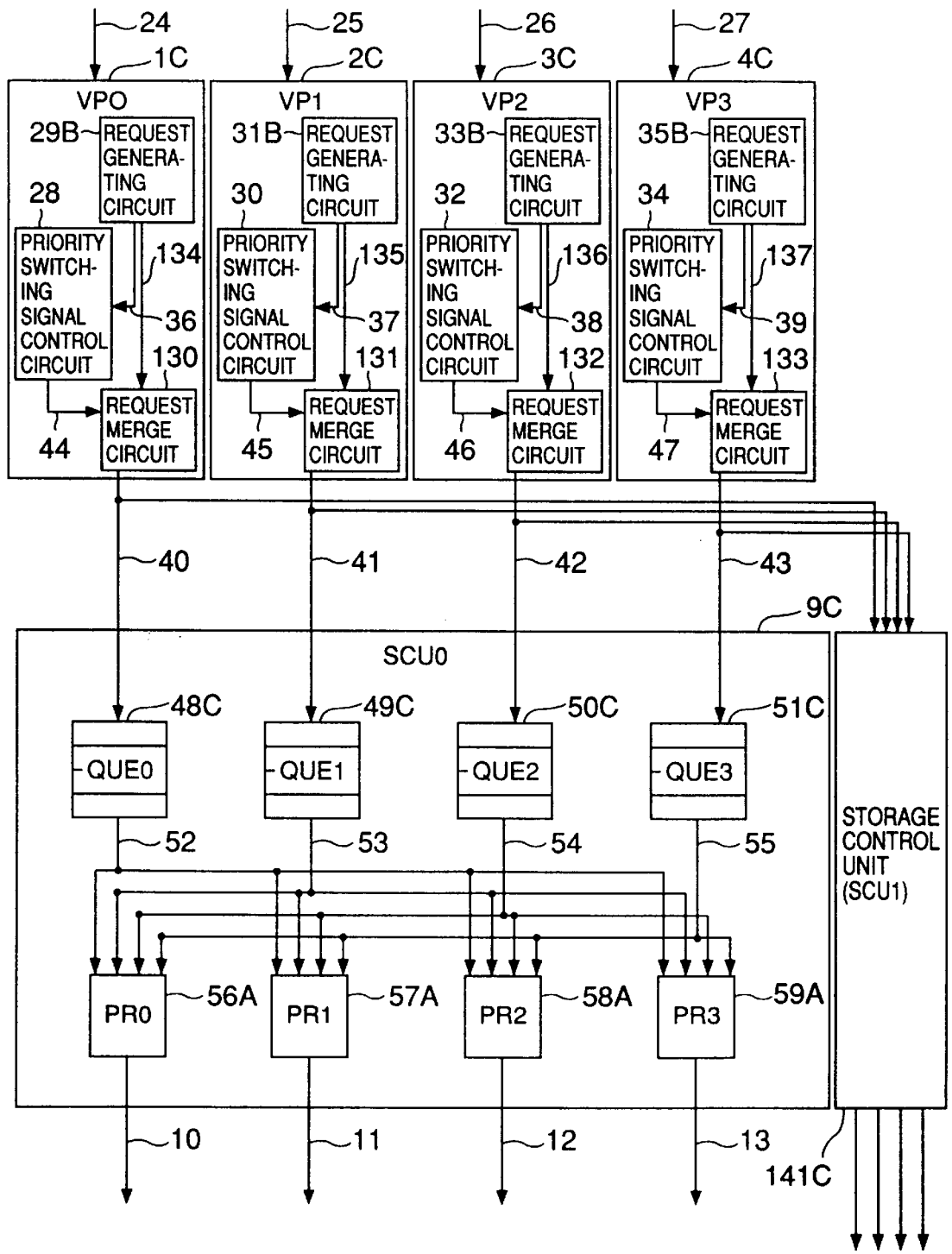
FIG. 16 shows configurations of a vector processor and a storage control unit according to a fourth embodiment of the invention.

FIG. 16 shows configurations of the vector processor and the storage control unit according to the fourth embodiment of the invention. In this figure, same components as those of the second and third embodiments are denoted by like reference numerals. Further, modifications of the corresponding components in the second and third embodiments are designated by like reference numerals affixed with "C".

The instant embodiment differs from the second and third embodiments in that the vector processors 1C, 2C, 3C and 4C incorporate the request generating circuits 29B, 31B, 33B and 35B employed in the third embodiment.

The storage control unit 9C differs from that of the second embodiment in respect to the request queues 48C, 49C, 50C and 51C. The storage control unit 141C is implemented in the same configuration as the storage control unit 9C.

The request queues 48C, 49C, 50C and 51C differ from those of the second embodiment in that the former hold the requests sent from the respective vector processors 1C, 2C, 3C and 4C without fail when the priority change-over bit is "1".

Further, the instant embodiment differs from the third embodiment in that the request queues 48C, 49C, 50C and 51C necessarily hold the requests when the priority change-over bit is "1". Owing to this feature, the requests issued by the vector processors and having the priority change-over bit of "1" can be issued to all the storage control units 9C and 132C.

The instant embodiment can ensure performance comparable to that of the second embodiment.

Embodiment 5

The instant embodiment is so arranged that when the priority of a particular one of the vector processors is to be raised beyond the other processors, the priority of that particular processor is fixed at the highest level to thereby minimize the delay involved in the main storage access conflict arbitration processing.

Thus, according to the teaching of the invention incarnated in the instant embodiment, any particular vector processor for which a signal commanding the priority thereof is to be raised by a service processor is allocated with the highest priority in all the priority circuits.

Figure 20:
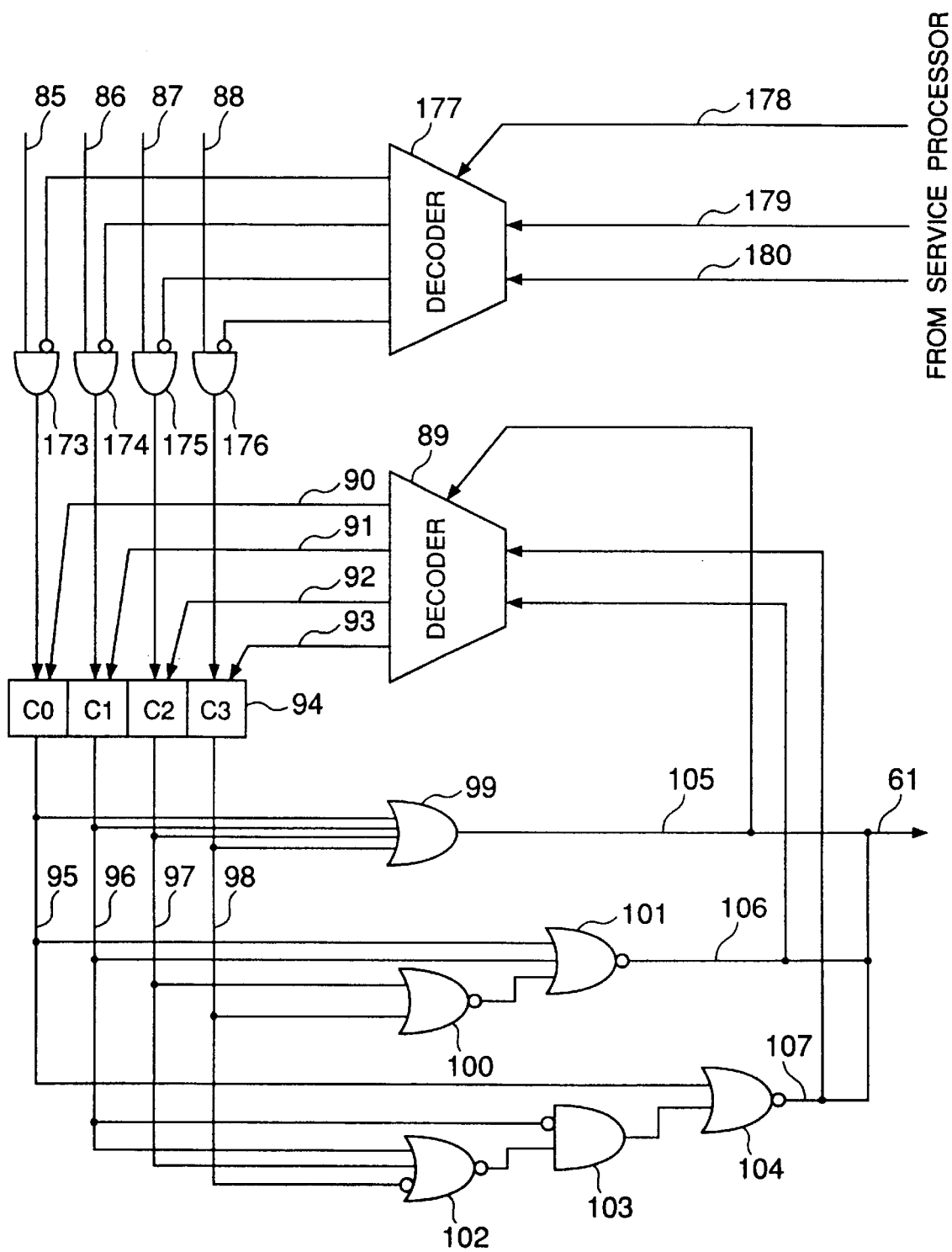
FIG. 20 shows a configuration of the priority control circuit according to a fifth embodiment of the invention.

The instant embodiment can be applied to the first and third embodiments of the invention. It should also be mentioned that the instant embodiment can be realized by modifying partially the priority control circuit 56 of the first and third embodiments. FIG. 20 shows a configuration of the priority control circuit according to the fifth embodiment of the invention.

In FIG. 20, components same as or equivalent to those shown in FIG. 6 are indicated by like reference numerals. The arrangement of the instant embodiment differs from the that shown in FIG. 6 in that paths 178, 179 and 180 are provided for receiving a priority fixation signal and the vector processor ID number from the service processor (not shown) in combination with a decoder 177 and AND circuits 173, 174, 175 and 176.

Operation of the priority control circuit shown in FIG. 20 will now be described.

The service processor outputs constantly the priority fixation signal and the vector processor ID signal. Upon reception of the priority fixation signal from the service processor via a path 178, the vector processor ID number on the paths 179 and 180 is decoded. The result of decoding is inputted to the AND circuits 173, 174, 175 and 176, whereby one of the priority switching signals 85, 86, 87 and 88 supplied from the vector processors which is designated by the service processor can be set to other than "1". In this manner, the priority of the vector processor designated by the service processor can be prevented from being lowered, as a result of which the priority of that vector processor can be set to highest level.

In the case of the second embodiment, the priority switching signal is placed in the request queue together with the last one of the serial requests. However, this signal may be placed in the request queue, e.g. QUE0 as one request after the final signal. In this case, each of the request queues and the priority circuits may be complemented in the same configuration as in the case of the first embodiment.

As is apparent from the foregoing according to the present invention, there can be obtained a multiprocessor system in which delay in the processing due to the main storage access conflict between or among the processor can be suppressed to a minimum.

Further, according to another aspect of the invention, a multiprocessor system can be realized in which the priority in accessing a main storage of a given one of processors can be raised by virtue of provision of a service processor.

What is claimed is:

1. An integrated circuit, comprising:
   a processor;
   a first circuit for issuing a plurality of access requests to a memory provided outside of said integrated circuit, in response to a memory access instruction executed by said processor;
   a second circuit for counting a total number of access requests issued by said first circuit and for outputting a predetermined signal outside of said integrated circuit when the counted total number of said access requests attains a predetermined value; and
   means for outputting said predetermined signal by merging said predetermined signal into one of the access requests issued by said first circuit.

2. An integrated circuit according to claim 1, wherein said predetermined signal is a signal for commanding change of priority of said processor.

3. An integrated circuit according to claim 2, wherein said predetermined signal is a signal for commanding lowering of priority of said processor.

4. An integrated circuit including a conflict arbitration scheme, comprising:
   a plurality of request input means each for accepting requests inputted from outside of the integrated circuit;
   a plurality of request queues provided in one-to-one correspondence to said plurality of request input means for holding temporarily requests received by corresponding ones of said plurality of request input means;
   a plurality of priority switching signal input means provided in one-to-one correspondence to said plurality of request input means for receiving priority switching signals relevant to a corresponding one of said plurality of request input means;
   a plurality of priority circuits each for selecting a number of requests which is smaller in number than a total number of said request input means from said inputted requests, each priority circuit outputting requests selected thereby to outside of the integrated circuit;
   a plurality of priority store means each provided in one of said plurality of priority circuits for storing priority information concerning priority of said plurality of request input means;
   priority control means for switching the priority information stored in said plurality of priority store means so that priority of one of the plurality of request input means corresponding to one of said plurality of priority signal input means to which a priority switching signal is inputted is changed in accordance with said inputted priority switch signal;
   a plurality of request decoding means each provided in correspondence to one of said plurality of request queues, each request decoding means decoding requests held in a corresponding one of said request queues, separating a priority switching signal merged to one of the held requests, and providing said separated priority switching signal to said plurality of priority circuits when said separated priority switching signal commands change of priorities of said plurality of request input means; and
   a plurality of priority control means provided in one-to-one correspondence to said plurality of priority circuits, each for switching the priority information stored in one of said plurality of store means provided in correspondence to a corresponding one of the plurality of said priority circuits, in accordance with said separated priority switching signal so as to switch priorities of the plurality of request input means corresponding to one of the plurality of request queues, which issued the separated priority switching signal.

5. A request selecting circuit, comprising:
   a plurality of requesters each for outputting a plurality of requests sequentially;
   means for holding priority information concerning priorities of said plurality of requesters;
   a selector circuit for selecting one of plural requests issued by said plurality of requesters in accordance with the priority information;
   a counter circuit for counting a total number of access requests issued by said requesters; and
   a switching circuit for changing the priority information held by said hold means in dependence on the counted total number of requests issued by each of said requesters, so as to change priorities of said requesters relative to one another in dependence on total numbers of requests issued by said requesters, respectively, wherein said switching circuit comprises a circuit for changing the priority information so as to switch a priority of each requester whenever the counted total number of requests issued by said each requester has reached a predetermined number.

6. A request selecting circuit according to claim 5, wherein each requester includes means for outputting a plurality of requests by grouping said requests into sets each having a same number of requests as said predetermined number.

7. A request selecting circuit according to claim 5, wherein said circuit for changing the priority information depends upon the counted total number of requests issued by each of said requesters, so as to lower priority of each requester relative to other requesters.

8. A request selecting circuit according to claim 7, wherein each of said requesters includes means for outputting a plurality of requests by grouping said requests into sets each having a same number of requests as said predetermined number.

9. A request selecting circuit, comprising:
   a plurality of requesters each for outputting a plurality of requests sequentially;

means for holding priority information concerning priorities of said plurality of requesters;

a selector circuit for selecting one of plural requests issued from said plurality of requesters in accordance with the priority information;

a counter circuit for counting a total number of access requests issued by said requesters; and a switching circuit for changing the priority information in dependence on the counted total number of requests issued by each of said requesters and selected by said selector circuit, so as to change priority of said requester relative to other requesters in dependence on the counted total number of requests, wherein said switching circuit comprises a circuit for changing the priority information so as to chance the priority of each requester relative to the other requesters every time the counted total number of requests issued by each of said requesters and selected by said selector circuit has reached a predetermined number.

10. A request selecting circuit according to claim 9, wherein each requester includes means for outputting a plurality of requests by grouping said requests into sets each having a same number of requests as said predetermined number.

11. A request selecting circuit according to claim 10, wherein said circuit for changing the priority information lowers the priority of each requester relative to the other requesters every time the counted total number of requests issued by each of said requesters and selected by said selector circuit has reached the predetermined number.

12. A request selecting circuit, comprising:

a plurality of requesters each for outputting a plurality of requests sequentially;

means for holding priority information concerning priorities of said plurality of requesters;

a selector circuit for selecting one of plural requests issued from said plural requesters in accordance with the priority information;

a counter circuit for counting a total number of access requests issued by said requesters;

a plurality of signal output means provided in one-to-one correspondence to said requesters, for outputting priority switching signals at timings determined in accordance with the counted total numbers of requests issued by corresponding ones of said requesters;

a plurality of signal delay means provided in one-to-one correspondence to said plurality of signal output means, for delaying for a predetermined time priority switch signals output from corresponding ones of said plurality of signal output means; and a priority information switching circuit responsive to a priority switching signal output from one of said plurality of signal delay means, for changing the priority information so that the priority of one of said requesters corresponding to said one signal output means is changed relative to other requesters, wherein each signal output means includes means for outputting a priority switch signal whenever the counted total number of requests issued from one of said requesters corresponding to said signal output means has reached a predetermined number.

13. A request selecting circuit according to claim 12, wherein said priority information switching circuit comprises a circuit which responds to the priority switch signal output from one of said plurality of signal delay means and changes the priority information so that the priority of one of said requesters corresponding to said one signal output means is changed relative to other requesters.

14. A request selecting circuit according to claim 12, wherein said predetermined time is selected so as not to be shorter than at least a time required for said selector circuit to select said predetermined number of requests after said predetermined number of requests have been output by one of said requesters.

15. A request selecting circuit according to claim 12, wherein each requester includes means for outputting said plurality of requests by grouping said requests into a plurality of sets each having a same number of requests equal to said predetermined number.

16. A request selecting circuit, comprising:

a plurality of requesters each for outputting a plurality of requests sequentially;

means for holding priority information concerning priorities of said plurality of requests;

a selector circuit for selecting one of plural requests issued from said plural requesters in accordance with the priority information;

a counter circuit for counting a total number of access requests issued by said requesters;

a plurality of request output means provided in one-to-one correspondence to said requesters, for outputting priority switching requests at timings determined in accordance with the counted total number of requests issued by corresponding ones of said requesters; and a priority information switching circuit responsive to selection of a priority switching request output from one of said plurality of request output means, for changing the priority information so that priority of one of said requesters including said one request output means is changed relative to other requesters, wherein each request output means includes means for outputting a priority switch request whenever the counted total number of requests issued from one of said requesters including said request output means has reached a predetermined number.

17. A request selecting circuit according to claim 16, wherein said priority information switching circuit comprises a circuit which responds to a priority switch signal output from one of said plurality of request output means for changing the priority information so that a priority of one of said requesters including said one request output means is lowered relative to corresponding requesters.

18. A request selecting circuit according to claim 16, wherein said predetermined time is selected so as not to be shorter than at least a time required for said selector circuit to select said predetermined number of requests after said predetermined number of requests have been output by one of said requesters.

19. A request selecting circuit according to claim 16, wherein each of said requesters includes means for outputting said plurality of requests by grouping said requests into a plurality of sets each having a same number of requests as said predetermined number.

20. A request selecting circuit, comprising:

a plurality of requesters each for generating a plurality of requests by grouping said requests into a plurality of sets each having a predetermined number of requests;

a counter circuit for counting a total number of access requests issued by said requesters;

a plurality of selector circuits each provided in correspondence to one of a plurality of processing circuits for processing particular types of requests, each selector circuit selecting one request from a plurality of requests output by said plural requesters and supplying said selected request to a corresponding one of the processing circuits, respectively;

priority information hold means for holding priority information concerning priorities of said plurality of requesters as priority information common to said selector circuits and to be supplied to said selector circuits; and a priority information switching circuit for changing the priority information so that whenever a counted total number of requests equal in number to said predetermined number has been output from one of said plurality of requesters, the priority of said one requester is changed.

21. A request selecting circuit according to claim 20, wherein said priority information switching circuit includes a circuit which responds to a priority switch signal output from one of said plurality of request output means and changes the priority information so that a priority of said one requester is lowered relative to other requesters.

22. A request selecting circuit according to claim 20, wherein said priority information hold means includes a plurality of hold means provided in one-to-one correspondence to said plurality of selector circuits and each in the vicinity of a corresponding selector circuit, for holding the priority information as one to be supplied to a corresponding one of said selector circuits.

23. A request selecting circuit according to claim 20, wherein said switching circuit includes:

a plurality of first means provided in one-to-one correspondence to said plurality of requesters, each first means outputting a priority switching signal to a corresponding one of said requesters every time a series of requests output sequentially from said corresponding requester has attained said predetermined number;

a plurality of second means provided on one-to-one correspondence to said plurality of first means, each second means delaying for a predetermined time a priority switching signal output from a corresponding one of said plurality of first means; and third means for changing the priority switching information held by said priority switching information hold means so that when a priority switching signal is output from one of said plurality of second means, a priority of one of the requesters to which the one first means is changed relative to other requesters.

24. A request selecting circuit according to claim 20, wherein said priority information switching circuit incudes:

a plurality of first means provided in one-to-one correspondence to said plurality of requesters, each first means sending a priority switching signal to said plurality of selector circuits every time a series of requests output sequentially from a corresponding one of said requesters has attained said predetermined number; and second means connected to said plural selector circuits, responsive to selection of a priority switching signal sent from one of said plurality of first means by said plural selector circuits for changing the priority information with respect to one of the requesters including said one first means.

25. A request selecting circuit according to claim 24, wherein said priority information hold means includes a plurality of hold means provided in one-to-one correspondence to said plurality of selector circuits;

each selector circuit includes means for informing the requesters of whether said selector circuit can accept a request from a corresponding one of the requesters;

each first means includes means for sending a priority switching request to said plurality of selector circuits from a corresponding one of said requesters on a condition that each of said plurality of selector circuits have informed said requesters that said selector circuit can accept a request;

each selector circuit includes means for selecting a priority switching request with preference when said priority switching request is included in requests sent from said plurality of requesters to said selector circuit; and wherein said switching circuit includes a plurality of switching circuitries provided in one-to-one correspondence to said plurality of selector circuits, each switching circuitry disposed in a vicinity of a corresponding selector circuit and including means responsive to selection of a priority switching request by a corresponding one of said selector circuits for changing the priority information held by one of said plurality of hold means provided in association with said corresponding selector circuit so as to change a priority of one of the requesters which has issued said selected priority switching request.

\* \* \* \* \*